US 7,464,200 B2

(12) United States Patent
Aoki

(10) Patent No.: US 7,464,200 B2
(45) Date of Patent: Dec. 9, 2008

(54) OUTPUT PORT DETERMINING APPARATUS

(75) Inventor: Tomokazu Aoki, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 890 days.

(21) Appl. No.: 10/404,154

(22) Filed: Apr. 2, 2003

(65) Prior Publication Data

US 2004/0039853 A1 Feb. 26, 2004

(30) Foreign Application Priority Data

Aug. 23, 2002 (JP) .............................. 2002-243148

(51) Int. Cl.
*G06F 3/00* (2006.01)
*G06F 5/00* (2006.01)
*G06F 15/173* (2006.01)

(52) U.S. Cl. ........................................ 710/36; 709/238
(58) Field of Classification Search .................... 710/36; 709/238, 243, 244
See application file for complete search history.

(56) References Cited

U.S. PATENT DOCUMENTS 5,150,464 A * 9/1992 Sidhu et al. .................. 709/222
5,457,679 A * 10/1995 Eng et al. ............... 370/395.31
5,570,466 A * 10/1996 Oechsle ....................... 709/238
5,761,440 A * 6/1998 De Marco et al. ........... 709/245
5,802,047 A * 9/1998 Kinoshita .................... 370/359
6,308,220 B1 * 10/2001 Mathur ........................ 709/238
6,496,510 B1 * 12/2002 Tsukakoshi et al. ......... 370/401

FOREIGN PATENT DOCUMENTS

JP          11-261647           9/1999

* cited by examiner

*Primary Examiner*—Tariq R. Hafiz
*Assistant Examiner*—Michael Sun
(74) *Attorney, Agent, or Firm*—Arent Fox LLP

(57) ABSTRACT

An output port determining apparatus is capable of determining a longest match for a network address without the necessity of processing operations in memory devices. Output ports are connected to networks. An address bus has signal lines corresponding to bits of a node address which uniquely identifies a node as a connection destination. A plurality of memory devices are connected to as many the signal lines as the number of bits of network addresses of the networks, and store port information representing the output ports to output data therefrom at memory addresses corresponding to the network addresses. An address register outputs a received node address to the address bus. A selecting circuit selects the port information stored in one of the memory devices which is connected to the most signal lines, from port information outputted from the memory devices according to the node address, and outputs the selected port information.

12 Claims, 16 Drawing Sheets

90: LIST OF COMMANDS

| BIT | COMMANDS |
|---|---|
| 15:14 | SETTING NUMBER OF CYCLES IN PHASE W2 OF WRITE SIGNAL (1 to 4 CYCLES) |
| 13:12 | SETTING NUMBER OF CYCLES IN PHASE W1 OF WRITE SIGNAL (1 to 4 CYCLES) |
| 11:10 | SETTING NUMBER OF CYCLES IN PHASE W0 OF WRITE SIGNAL (1 to 4 CYCLES) |
| 9:7 | SETTING NUMBER OF CYCLES OF READ SIGNAL |
| 6 | SETTING OUTPUTTING OF WRITE SIGNAL, READ SIGNAL (1: WRITE SIGNAL, 0: READ SIGNAL) |
| 5 | SETTING ACCESS TO ALL RAMS (1: TO BE ACCESSED, 0: NOT TO BE ACCESSED) |
| 4:0 | SETTING ADDRESS MASK LENGTH |

FIG. 8

OUTPUT PORT DETERMINING APPARATUS

CROSS-REFERENCE TO RELATED APPLICATIONS

This application is based upon and claims the benefits of priority from the prior Japanese Application No. 2002-243148, filed on Aug. 23, 2002, the entire contents of which are incorporated herein by reference.

BACKGROUND OF THE INVENTION

1. Field of the Invention

The present invention relates to an output port determining apparatus for determining an output port of data, and more particularly to an output port determining apparatus for determining an output port connected to a network which has a network address having the longest match for a node address.

2. Description of the Related Art

IP routers connect different networks with each other in order to perform packet communications between those connected networks. Specifically, an IP router analyzes the header of a packet communicated between the connected networks, and selects a network route for the packet based on the IP address contained in the header.

The IP router searches for a network address which has the longest match for the IP address and transmits the packet through a shortest communication route for high-speed packet communications. The network address which has the longest match for the IP address is searched for by a software-implemented process or a hardware-implemented facility. One hardware apparatus for performing longest-match searching is disclosed in Japanese laid-open patent publication No. 11-261647.

The conventional apparatus for performing longest-match searching employs a Content Associated Memory (CAM) which performs processing operations for searching for a network address based on a longest match, which arises, however, a problem of making its hardware arrangement more complex.

SUMMARY OF THE INVENTION

It is therefore an object of the present invention to provide an output port determining apparatus for determining an output port, such that the necessity of processing operations within a memory device is avoided and a longest match determination through the use of a simple hardware arrangement is provided.

To achieve the above object, there is provided in accordance with the present invention an output port determining apparatus for determining an output port of data. The output port determining apparatus comprises a plurality of output ports connected to networks, an address bus having signal lines corresponding to bits of a node address which uniquely identifies a node as a connection destination, a plurality of memory devices connected to as many the signal lines as the number of bits of network addresses of the networks, for storing port information representing the output ports to output data therefrom at memory addresses corresponding to the network addresses, an address register for outputting the node address to the address bus, and a selecting circuit for selecting the port information stored in the memory device to which the most signal lines are connected, from the port information outputted from the memory devices according to the node address, and outputting the selected port information.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 8 is a diagram showing a list of commands for the RAM-read/write circuit;

DESCRIPTION OF THE PREFERRED EMBODIMENTS

Preferred embodiments of the present invention will be described hereinafter with reference to the drawings.

Figure 1:
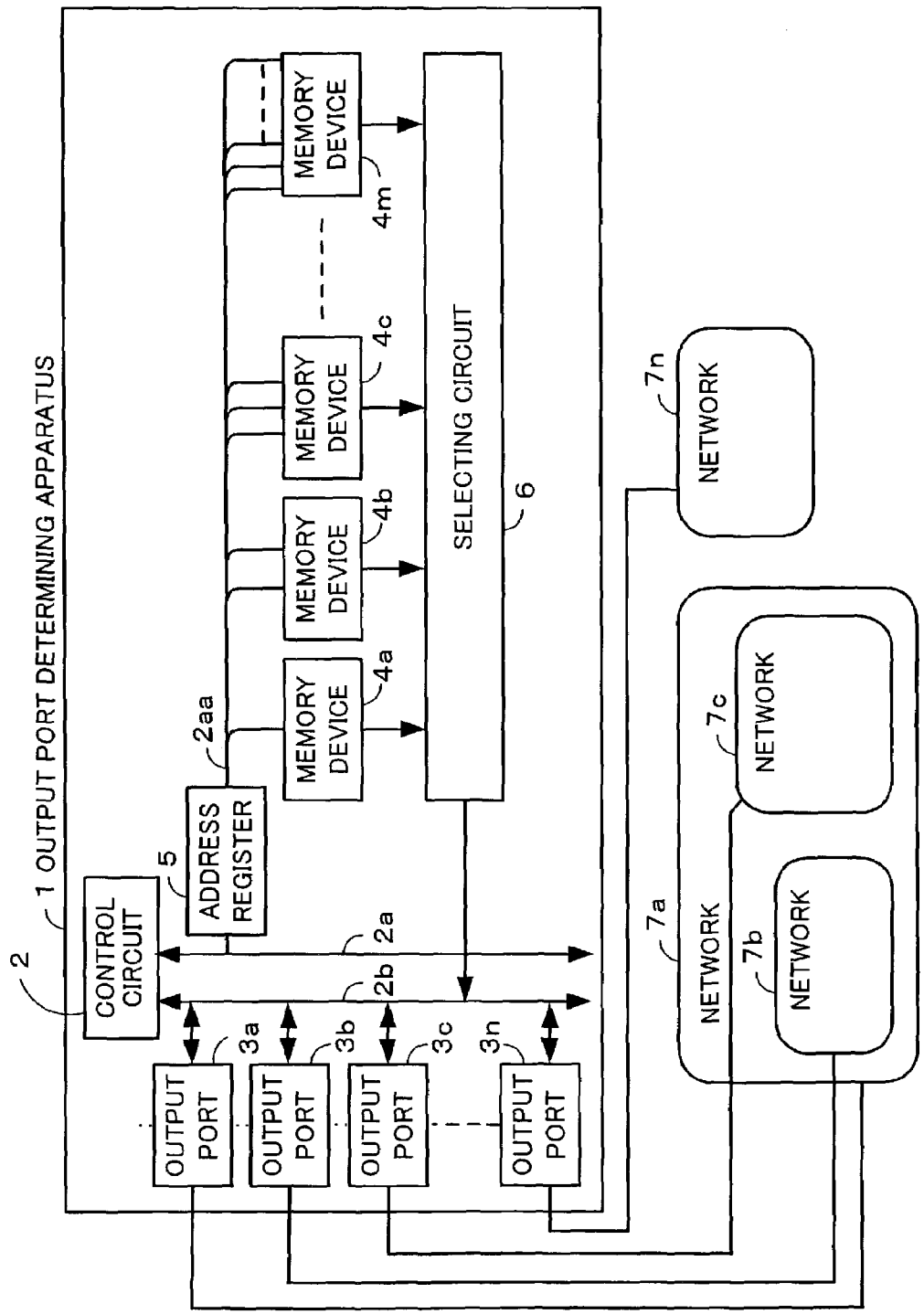
FIG. 1 is a block diagram showing the principle of the present invention.

FIG. 1 shows the principles of the present invention. As shown in FIG. 1, an output port determining apparatus 1 comprises a control circuit 2, output ports 3a through 3n, memory devices 4a through 4m, an address register 5, and a selecting circuit 6.

The output port determining apparatus 1 is connected to networks 7a through 7n and other networks (not shown). The networks 7a through 7n are assigned network addresses, respectively. The output port determining apparatus 1 receives, from the networks 7a through 7n and the other networks, data each of which has a node address that uniquely identifies a node as a connection destination. The output port determining apparatus 1 sends data to the networks 7a through 7n according to network addresses contained in the node addresses.

The control circuit 2 is connected to an address bus 2a. The control circuit 2 is also connected to a data bus 2b through which data are sent and received. The control circuit 2 outputs the node addresses possessed by the data received from the networks 7a through 7n to the address register 5 via the address bus 2a. The control circuit 2 also sends the received data to the output ports 3a through 3n according to port information outputted from the selecting circuit 6, which is indicative of the output ports 3a through 3n from which to output the data.

The output ports 3a through 3n are connected to the data bus 2b. The output ports 3a through 3n are also connected to the networks 7a through 7n. The output ports 3a through 3n receive data sent from the control circuit 2 and sends the received data to the networks 7a through 7n.

The memory devices 4a through 4m are connected to an address bus 2aa corresponding to the bits of node addresses. Specifically, the memory devices 4a through 4m are connected to respective different numbers of signal lines of the address bus 2aa. One of the memory devices 4a through 4m which is connected to as many signal lines of the address bus 2aa as the number of bits of one of the network addresses of the networks 7a through 7n stores port information of an output port that is connected to the network to which the network address is allocated.

For example, it is assumed that a node address is represented by X bits. If Y bits among X bits of the node address represent a network address (X>Y), then a memory device connected to Y signal lines serves as the memory device which is connected to as many signal lines as the number of bits of the network address. The memory device connected to Y signal lines stores at a memory address corresponding to the network address the port information of the output port that is connected to the network to which the network address is allocated.

The memory devices 4a through 4m output data at a memory address specified by the address register 5 to the selecting circuit 6.

The address register 5 is connected to the address bus 2a and the address bus 2aa. The address register 5 outputs a node address supplied from the control circuit 2 to the address bus 2aa.

The selecting circuit 6 is connected to the memory devices 4a through 4m. The selecting circuit 6 is also connected to the data bus 2b. The selecting circuit 6 selects port information outputted from one of the memory devices 4a through 4m which is connected to the most signal lines of the address bus 2aa among the port information outputted from the memory devices 4a through 4m, and outputs the selected port information to the data bus 2b.

Operation of the output port determining apparatus 1 shown in FIG. 1 will be described below.

The control circuit 2 outputs the node address of data sent from one of the networks 7a through 7n or the other networks to the address register 5. The address register 5 outputs the node address to the address bus 2aa.

The memory devices 4a through 4m output stored port information depending on the node address outputted to the address bus 2aa, to the selecting circuit 6. The port information outputted from the memory device to which the most signal lines are connected represents the output port that is connected to a network having a longest network address.

The selecting circuit 6 selects the port information outputted from the memory device to which the most signal lines are connected, among the port information outputted from the memory devices 4a through 4m.

The control circuit 2 outputs the data to one of the output ports 3a through 3n according to the port information outputted from the selecting circuit 6. The output port which has received the data sends the data to the networks 7a through 7n.

As described above, an output port connected to a network address which has the longest match for the node address is determined in the memory devices 4a through 4m without the necessity of processing operations. Therefore, a longest match determining process can be carried out with a simple hardware arrangement.

A first embodiment of the present invention will be described below with respect to the case where the first embodiment is applied to a router for performing packet communications according to the TCP/IP protocol suite.

Figure 2:
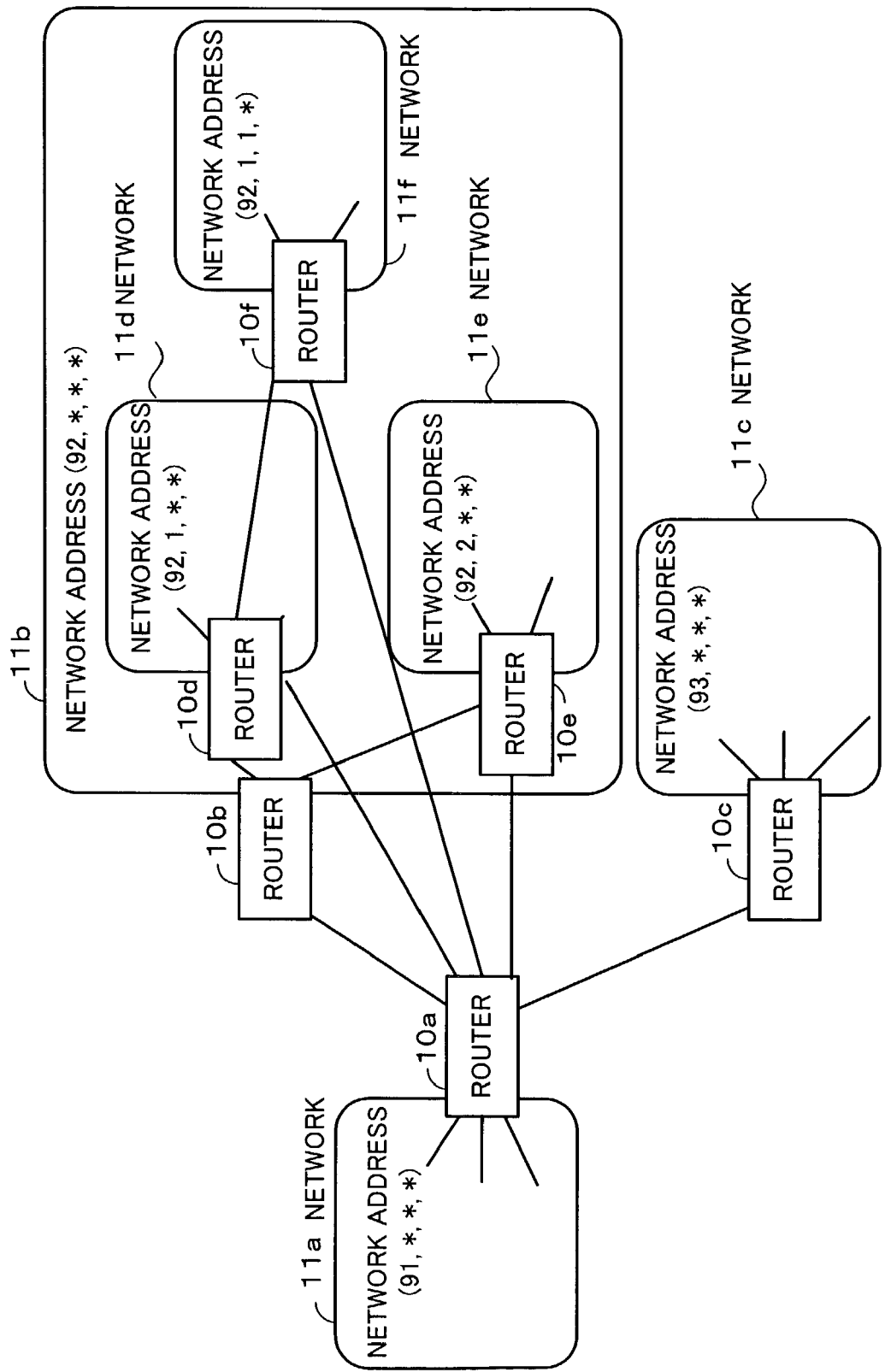
FIG. 2 is a block diagram when routers according to a first embodiment of the present invention are used for interconnecting networks.

FIG. 2 shows in block diagram networks which are interconnected by routers according to the first embodiment of the present invention. FIG. 2 illustrates routers 10a through 10f and networks 11a through 11f. FIG. 2 also shows the network addresses of the respective networks 11a through 11f. Unless otherwise specified, each of the network addresses is represented by 32-bit divided into 4 digits every 8 bits. The 32-bit data is expressed by decimal number (x1, x2, x3, x4).

In the example shown in FIG. 2, the network 11a has a network address (91, *, *, *), the network 11b a network address (92, *, *, *), the network 11c a network address (93, *, *, *), the network 11d a network address (92, 1, *, *), the network 11e a network address (92, 2, *, *), and the network 11f a network address (92, 1, 1, *). In each of the network addresses, "*" represents a masked (undefined) portion of the network address.

When the routers 10a through 10f receive a packet, they output the received packet to the networks 11a through 11f according to an IP address assigned to the packet. Specifically, the routers 10a through 10f output the packet to one of the networks 11a through 11f which has a network address having the longest match for the IP address.

For example, it is assumed that the router 10a has received a packet having an IP address (92,1,1,4). In this case, all of the networks 11b, 11d, 11f are proper transmission destinations for the packet. However, the router 10a outputs the packet to the router 10f of the network 11f whose network address (92, 1, 1, *) is the longest match for the IP address.

In this manner, the router 10a sends the packet to the network 11f whose network address is the longest match for the IP address.

Figure 3:
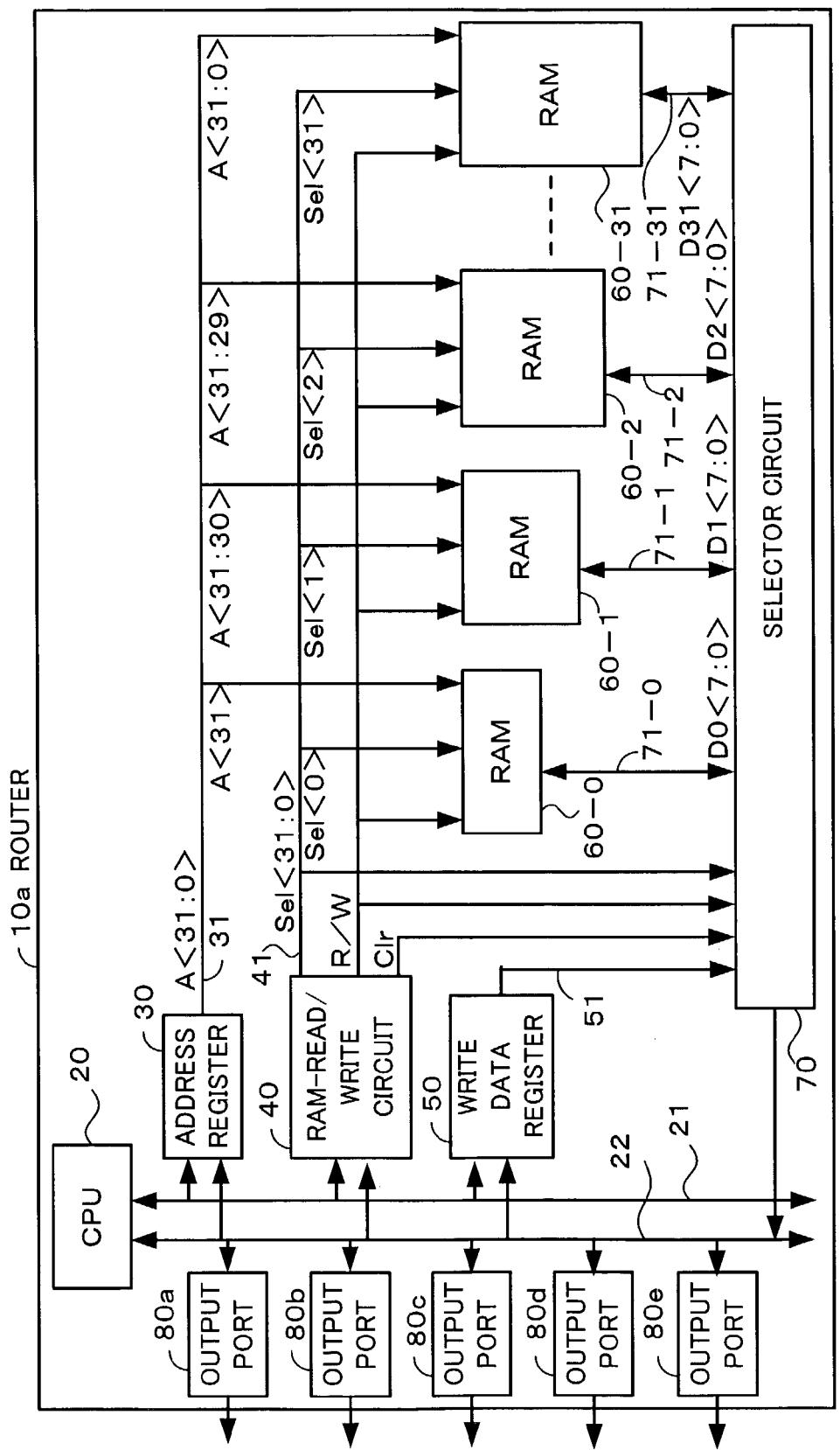
FIG. 3 is a block circuit diagram of one of the routers according to the first embodiment.

FIG. 3 shows the router 10a in block form. As shown in FIG. 3, the router 10a has a CPU 20, an address register 30, a RAM-read/write circuit 40, a write data register 50, RAMs 60-0 through 60-31, a selector circuit 70, and output ports 80a through 80e.

The CPU 20 is connected to a 32-bit address bus 21 and a 32-bit data bus 22. The CPU 20 outputs an IP address of a packet sent from the networks 11a through 11f or other networks to the address bus 21. The CPU 20 writes port information representing the output ports 80a through 80e from which the packet is to be outputted, in memory addresses of the RAMs 60-0 through 60-31 corresponding to the network addresses of the networks 11b through 11f as connection destinations.

The address register 30 comprises a 32-bit register. The address register 30 is connected to the CPU 20 by the address bus 21 and the data bus 22. The address register 30 is also connected to a 32-bit address bus 31. The signal line of each bit of the address bus 31 is represented by A<x>, and a plurality of signal lines of the address bus 31 is represented by A<x:y>. For example, the signal line of the 31st bit of the address bus 31 is represented by A<31>, and the signal lines ranging from the 31st bit to the 20th bit are represented by A<31:20>.

When an IP address of a packet is outputted from the CPU 20, the address register 30 outputs the IP address to the address bus 31. The signal lines of the address bus 31 correspond to the respective bits of the IP address. Specifically, the signal line A<31> corresponds to the 30th bit of the IP address. The signal lines A<29>through A<0> correspond respectively to the 29th bit through the 0th bit of the IP address.

The RAM-read/write circuit 40 is connected to the CPU 20 via the address bus 21 and the data bus 22. The RAM-read/write circuit 40 is connected to a 32-bit select bus 41. The RAM-read/write circuit 40 is also connected to the RAMs 60-0 through 60-31 via signal lines R, W, and also connected to the selector circuit 70 via a signal line Clr. As with the signal line A<x> and the signal lines A<31:0>, each signal line of the select bus 41 is represented by Sel<x> and a plurality of signal lines of the select bus 41 are represented by Sel<x:y>.

The RAM-read/write circuit 40, into which the effective address length of the network address of one of the networks connected to the respective output ports 80a through 80e is written by the CPU 20, outputs a select signal to one of the signal lines Sel which corresponds to the written effective address length. For example, the network 11b has the network address (92, *, *, *) as shown in FIG. 2. The effective address length of this network address is 8 bits. When the CPU 20 writes the effective address length "8" in the RAM-read/write circuit 40, the RAM-read/write circuit 40 outputs a select signal to the signal line Sel<7>.

The write data register 50 comprises an 8-bit register. The write data register 50 is connected to the CPU 20 via the data bus 22. The write data register 50 is also connected to an 8-bit data bus 51. The write data register 50 outputs data written by the CPU 20 to the data bus 51.

The RAMs 60-0 through 60-31 are connected to progressively larger number of signal lines A of the address bus 31 which which increase, successively one by one, from the high-order bit toward the low-order bit of the address bus 31. Specifically, the RAM 60-0 is connected to the signal line A<31> of the address bus 31, the RAM 60-1 to the signal lines A<31:30> of the address bus 31, and the RAM 60-2 to the signal lines A<31:29> of the address bus 31. Similarly, the other RAMs are connected to successively incremental numbers of signal lines of the address bus 31 which increase on a one-by-one basis toward the low-order bit of the address bus 31, and the RAM 60-31 is connected to the signal lines A<31:0> of the address bus 31.

The RAMs 60-0 through 60-31 are also connected to the respective signal lines Sel of the select bus 41 which range successively from the low-order bit to the high-order bit of the select bus 41. Specifically, the RAM 60-0 is connected to the signal line Sel<0> of the select bus 41, the RAM 60-1 to the signal line Sel<1> of the select bus 41, and the RAM 60-2 to the signal line Sel<2> of the select bus 41. Similarly, the other RAMs are connected to the respective signal lines of the select bus 41 which range successively to the high-order bit of the select bus 41, and the RAM 60-31 is connected to the signal line Sel<31> of the select bus 41. The RAMs 60-0 through 60-31 are also connected to the signal lines R, W.

Of the RAMs 60-0 through 60-31, the RAMs 60-0 through 60-31 which are connected to the same number of signal lines A<31> through A<0> as the number of bits of the network addresses of the networks 11b through 11f store, at their memory addresses corresponding to those network addresses, the port information representing the output ports 80a through 80e connected to the networks 11b through 11f having those network addresses.

For example, the network address (92, *, *, *) requires 8 bits in binary representation. Of the RAMs 60-0 through 60-31, the RAM 60-8 is connected to 8-bit signal lines. The memory address corresponding to "92", i.e., the memory address represented by the binary notation (0, 1, 0, 1, 1, 1, 0, 0), stores the port information representing the output port 80a that is connected to the network 11b having the network address (92, *, *, *).

The selector circuit 70 is connected to each of the RAMs 60-0 through 60-31 by respective 8-bit data buses 71-0 through 71-31. As with the signal line A<x> and the signal lines A<31:0>, signal lines of the data buses 71-0 through 71-31 are represented by D0<7:0> through D31<7:0>.

The selector circuit 70 refers to the 7th bit of each port information and selects the port information of the RAM, which is connected to the most signal lines, from the port information outputted from the RAMs 60-0 through 60-31, and outputs the selected port information to the data bus 22. The CPU 20 outputs a packet to the output ports 80a through 80e according to the port information. The selector circuit 70 also outputs data written in the write data register 50 to the signal lines D0<7:0> through D31<7:0>.

The output port 80a is connected to the network 11b shown in FIG. 2. The output port 80b is connected to the network 11c. The output port 80c is connected to the network 11d. The output port 80d is connected to the network 11e. The output port 80e is connected to the network 11f. When the output ports 80a through 80e receive a packet sent from the CPU 20, the output ports 80a through 80e output the packet to the networks 11b through 11f as connection destinations.

Operation of the router 10a shown in FIG. 3 will be described below.

First, a process of initializing the RAMs 60-0 through 60-31 will be described below. The CPU 20 writes initializing data, e.g., "0", in the write data register 50. The selector circuit 70 outputs the initializing data "0" written in the write register 50 to the data buses 71-0 through 71-31.

The CPU 20 writes a network address to be initialized in the address register 30. The address register 30 outputs the network address to be initialized to the address bus 31.

The CPU 20 writes the effective address length of the network address into the RAM-read/write circuit 40. The RAM-read/write circuit 40 outputs a select signal to the signal line Sel which corresponds to the effective address length written by the CPU 20. Stated otherwise, one of the RAMs, to which the relevant signal lines A<31> through A<0> are connected, is selected to specify the network address.

For example, it is assumed that the network address to be initialized is (92, *, *, *). "92" is expressed as binary 8 bits (0, 1, 0, 1, 1, 1, 0, 0). Therefore, the address register 30 outputs "0" to the signal line A<31>, "1" to the signal line A<30>, "0" to the signal line A<29>, "1" to the signal line A<28>, "1" to the signal line A<27>, "1" to the signal line A<26>, "0" to the signal line A<25>, and "0" to the signal line A<24>. The signal lines A<23:0> are undefined, and any values may be outputted to these signal lines A<23:0>.

The network address (92, *, *, *) is represented in binary notation whose high-order 8 bits indicate a network address and whose low-order 24 bits are undefined. Therefore, the effective address length of the network address (92, *, *, *) is of 8 bits, and the RAM-read/write circuit 40 outputs a select signal to the signal line Sel<7>. In this example, consequently, 8 signal lines are required to specify the network address, and the RAM 60-7 connected to the 8 signal lines A<31:24> is selected. Thus, the address register 30 outputs "92" of the network address to the signal lines A<31:24>.

The RAM-read/write circuit 40 outputs a write signal to the signal line W. The RAM selected by the signal line Sel now stores the initializing data outputted to the data buses 71-0 through 71-31, written by the write signal outputted from the RAM-read/write circuit 40.

In the above example of the network address (92, *, *, *), the RAM 60-7 is selected by the select signal. In response to the write signal outputted from the RAM-read/write circuit 40, the initializing data outputted to the data bus 71-7 is written into the RAM 60-7 at a memory address which corresponds to the network address.(92, *, *, *).

In this manner, the RAMs 60-0 through 60-31 are initialized to the initializing data.

The addresses of the RAMs 60-0 through 60-31 other than the memory addresses corresponding to the network addresses of the networks that are connected to the output ports 80a through 80e store the initializing data in order to distinguish themselves from port information.

For simplifying the initializing process for all the RAMs described above, RAMs having a resetting function (to initialize the data in all the memory addresses) may be used for the above RAMs. In this case, a signal for resetting data in the RAMs is applied all the RAMs to initialize all the data stored in the RAMs.

Next, a process of setting port information in the memory addresses of the RAMs 60-0 through 60-31 which correspond to the network addresses will be described below. The CPU 20 writes one of the network addresses of the networks 11b through 11f connected to the output ports 80a through 80e into the address register 30. The address register 30 outputs the network address written by the CPU 20 to the address bus 31.

The CPU 20 writes in the write data register 50 the port information indicative of the output ports 80a through 80e connected to the networks 11b through 11f which have the network addresses written in the address register 30. The 7th bit of the port information is set to "1" which indicates that the port information itself is effective. The 6th through 0th bits of the port information are set as the port information of an output port from which a packet is to be outputted.

The selector circuit 70 outputs the port information written in the write data register 50 to the data buses 71-0 through 70-31.

The CPU 20 writes the effective address length of the network address in the RAM-read/write circuit 40. The RAM-read/write circuit 40 outputs a select signal to the signal line Sel which corresponds to the effective address length written by the CPU 20. Thus, the RAM connected to the same number of signal lines A as the number of bits required to specify the network address is selected.

The RAM-read/write circuit 40 outputs a write signal to the signal line W. The RAM selected by the signal line Sel now stores the port information outputted to the data buses 71-0 through 71-31 in response to the write signal outputted from the RAM-read/write circuit 40.

For example, it is assumed that the CPU 20 writes the network address (92, *, *, *) of the network 11b into the address register 30. The address register 30 outputs the network address written by the CPU 20 to the address bus 31.

The CPU 20 writes port information representing the output port 80a connected to the network 11b in the write data register 50. The selector circuit 70 outputs the port information written in the write data register 50 to the data buses 71-0 through 71-31.

If the network address (92, *, *, *) is expressed by binary 32 bits, then the bits ranging from the high-order 31st bit to the 24th bit are represented by (0, 1, 0, 1, 1, 1, 0, 0). Since the bits ranging from the 23rd bit to the 0th bit are undefined, any values may be outputted as these bits.

Therefore, the address register 30 outputs "0" to the signal line A<31>, "1" to the signal line A<30>, "0" to the signal line A<29>, "1" to the signal line A<28>, "1" to the signal line A<27>, "1" to the signal line A<26>, "0" to the signal line A<25>, and "0" to the signal line A<24>. Any values may be outputted to the signal lines A<23:0>.

The network address (92, *, *, *) is represented in binary notation whose high-order 8 bits indicate a network address and whose low-order 24 bits are undefined. Therefore, the effective address length of the network address (92, *, *, *) is of 8 bits, and the RAM-read/write circuit 40 outputs a select signal to the signal line Sel<7>. In this example, consequently, 8 signal lines are required to specify the network address, and the RAM 60-7 connected to the 8 signal lines A<31:24> is selected. Thus, the address register 30 outputs "92" of the network address to the signal lines A<31:24>.

When the RAM-read/write circuit 40 outputs a write signal to the signal line W, the RAM 60-7 stores the port information outputted to the data bus 71-7 in the memory address corresponding to the network address "92".

Specifically, the port information representing the output port 80a connected to the network 11b which has the network address (92, *, *, *) is stored in the memory address corresponding to the network address (92, *, *, *).

The above process is repeated to store the port information indicative of the output ports into the memory addresses of the RAM 60-0 through 60-31, which correspond to the network addresses of the networks 11c through 11f.

A process of searching for a network address having the longest match for an IP address and sending a packet to the network address will be described below. The CPU 20 receives a packet from the networks 11a through 11n or other networks. The CPU 20 then writes the IP address assigned to the packet in the address register 30.

The address register 30 outputs the written IP address to the address bus 31. When a read signal is outputted to the signal line R, the RAMs 60-0 through 60-31 output information stored in the memory address depending on the IP address outputted to the signal lines A to the data buses 71-0 through 71-31.

The selector circuit 70 refers to the 7th bits of the port information outputted from the RAMs 60-0 through 60-31, and selects the port information whose 7th bit is "1". The selector circuit 70 further selects, from the selected port information, the port information outputted from the RAM which is connected to the most signal lines A. The selected port information represents the output port connected to the network having the longest network address. The selector circuit 70 outputs the selected port information to the data bus 22.

The CPU 20 refers to the port information outputted from the selector circuit 70, and outputs the packet to one of the output ports 80a through 80e, which sends the packet to the corresponding one of the networks 11a through 11f.

For example, it is assumed that the CPU 20 has received a packet having an IP address (92, 1, 2, 3). The CPU 20 writes the IP address (92, 1, 2, 3) in the address register 30, which outputs the IP address to the address bus 31.

The network address (92, *, *, *) of the network 11b shown in FIG. 2 is represented by 8 bits. The memory address "92" of the RAM 60-7 connected to the 8-bit signal lines stores the port information indicative of the output port 80a connected to the network 11b. The network address (93, *, *, *) of the network 11c is represented by 8 bits. Therefore, the memory address "93" of the RAM 60-7 connected to the 8-bit signal lines stores the port information indicative of the output port 80b connected to the network 11c. The network address (92, 1, *, *) of the network lid is represented by 16 bits. Therefore, the memory address "92, 1" of the RAM 60-15 connected to the 16-bit signal lines stores the port information indicative of the output port 80c connected to the network lid. The network address (92, 2, *, *) of the network 11e is represented by 16 bits. Therefore, the memory address "92, 2" of the RAM 60-15 connected to the 16-bit signal lines stores the port information indicative of the output port 80d connected to the network lie. The network address (92, 1, 1, *) of the network 11f is represented by 24 bits. Therefore, the memory address "92, 1, 1" of the RAM 60-23 connected to the 24-bit signal lines stores the port information indicative of the output port 80e connected to the network 11f. The initializing data is stored in the other memory addresses.

Therefore, if the IP address (92, 1, 2, 3) is written in the address register 30, then the port information is outputted from the memory address "92" of the RAM 60-7 and the memory address "92, 1" of the RAM 60-15. The initializing data is outputted from the other memory addresses.

The selector circuit 70 identifies the port information from the initializing data with "1" in the 7th bit of the port information. The selector circuit 70 selects the port information stored in the RAM 60-15 to which the most signal lines are connected, from the identified port information, and outputs the selected port information to the data bus 22.

The CPU 20 outputs the packet to the output port 80c according to the port information outputted from the selector circuit 70.

Since an output port connected to a network address which has the longest match for the IP address is determined in the RAMs without the necessity of processing operations, as described above, a longest match determining process can be carried out using commercially available ordinary memories.

Furthermore, the cost of the output port determining apparatus 1 can be reduced by using commercially available ordinary memories.

The router 10a may be implemented by a one-chip semiconductor device.

Operation of the registers and circuits shown in FIG. 3 will be described in detail below.

Figure 4:
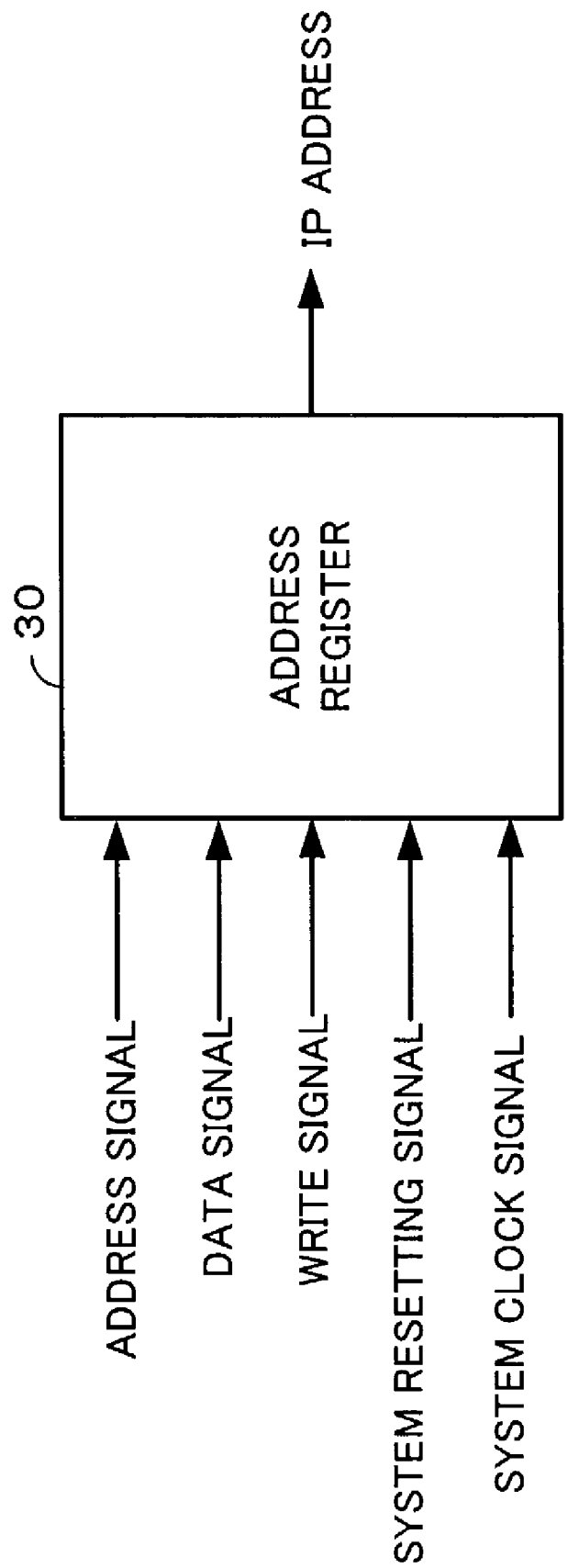
FIG. 4 is a diagram showing an address register shown in FIG. 3 and signals that are inputted and outputted to and from the address register.

FIG. 4 shows the address register 30 shown in FIG. 3 and signals that are inputted to and outputted from the address register 30. As shown in FIG. 4, an address signal is inputted from the CPU 20 to the address register 30 through the address bus 21. The address register 30 is assigned to a memory space in the CPU 20, and selected by the address signal from the CPU 20.

A data signal is inputted from the CPU 20 to the address register 30 through the data bus 22. The data signal inputted to the address register 30 comprises a 32-bit IP address.

A write signal is inputted from the CPU 20 to the address register 30 through a control bus, not shown in FIG. 3. A system resetting signal SR which is generated within the router 10a, for example, is inputted to the address register 30 through the control bus. A system clock signal SC is inputted to the address register 30 through a clock line, not shown in FIG. 3.

The address register 30 is selected by an address signal from the CPU 20. The address register 30 is supplied with a data signal, i.e., an IP address, from the CPU 20. When the address register 30 then receives a write signal from the CPU 20, the address register 30 holds the value of the supplied IP address, and outputs the value of the IP address to the address bus 31.

Figure 5:
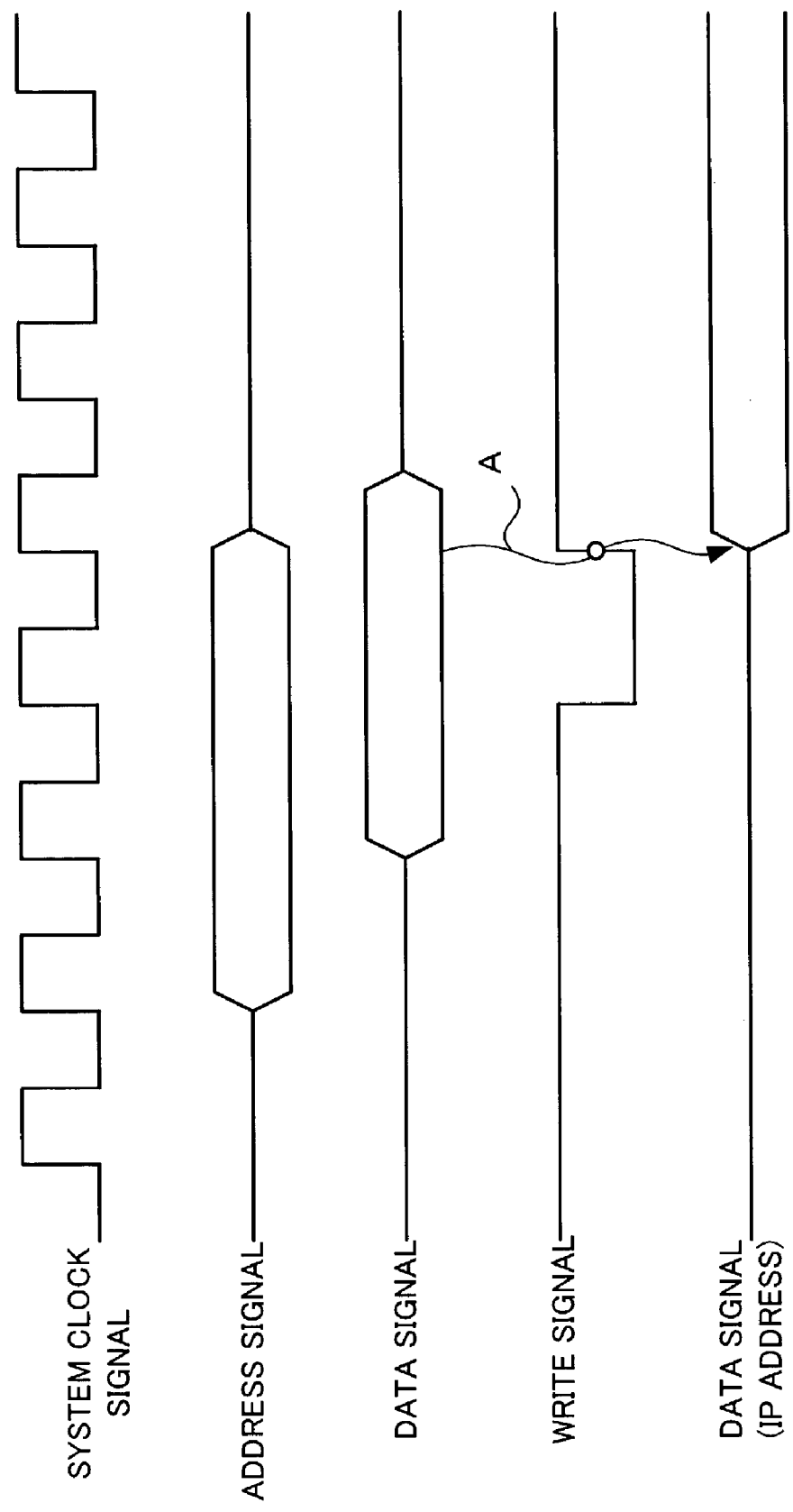
FIG. 5 is a timing chart of operation of the address register.

FIG. 5 is a timing chart of operation of the address register 30. The address register 30 operates in synchronism with a system clock signal SC shown in FIG. 5. The address register 30 is supplied with an address signal and a data signal which is inputted later than the address signal, from the CPU 20. In the example shown in FIG. 5, the data signal is outputted from the CPU 20 later than the address signal by one clock period of the system clock signal SC.

The address register 30 is also supplied with a write signal later than the data signal, from the CPU 20. In the example shown in FIG. 5, the write signal is outputted from the CPU 20 later than the data signal by one clock period of the system clock signal SC. The address register 30 holds the inputted data signal and outputs the data signal to the address bus 31 in synchronism with a positive-going edge of the write signal indicated by the arrow A.

When a system resetting signal SR is inputted to the address register 30, the address register 30 resets the data signal held therein, e.g., to "0".

As described above, the address register 30 is decoded by the address signal from the CPU 20. The address register 30 is thus supplied with the data signal, i.e., an IP address, from the CPU 20. When the address register 30 receives the write signal from the CPU 20, the address register 30 holds the value of the supplied IP address and outputs the value of the IP address to the address bus 31.

Figure 6:
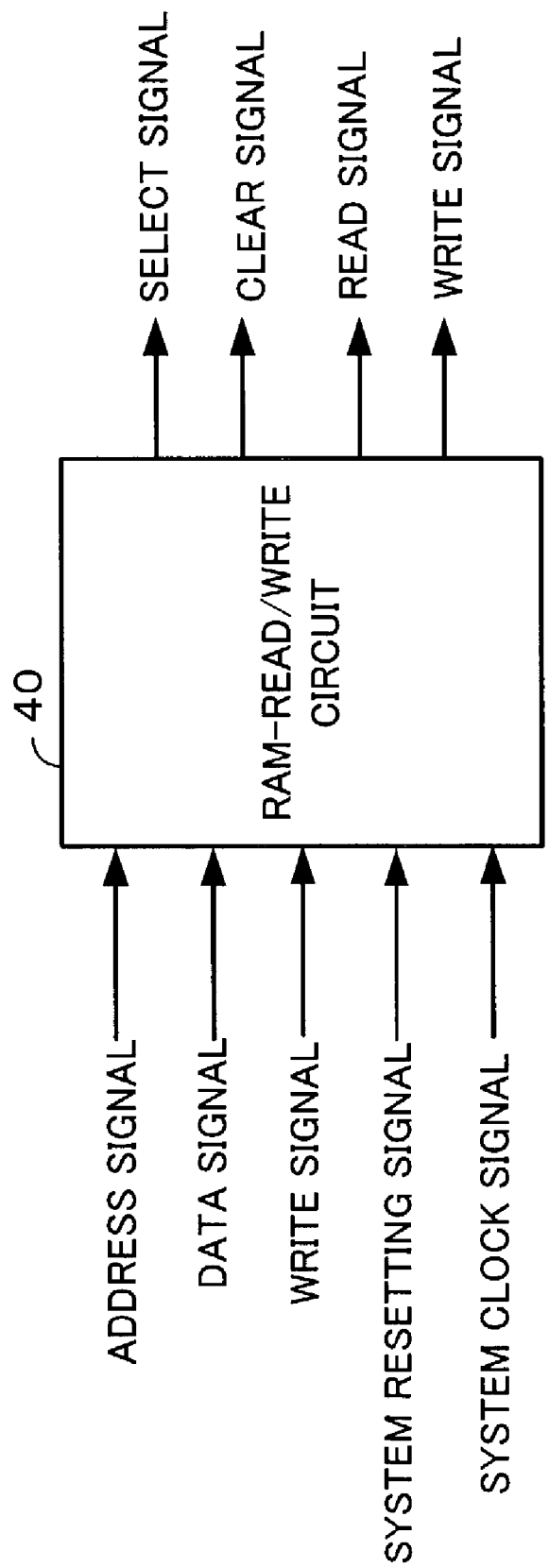
FIG. 6 is a diagram showing a RAM-read/write circuit shown in FIG. 3 and signals that are inputted and outputted to and from the RAM-read/write circuit.

FIG. 6 shows the RAM-read/write circuit 40 shown in FIG. 3 and signals that are inputted to and outputted from the RAM-read/write circuit 40. As shown in FIG. 6, an address signal is inputted from the CPU 20 to the RAM-read/write circuit 40 through the address bus 21. The RAM-read/write circuit 40 is assigned to a memory space in the CPU 20, and selected by the address signal from the CPU 20.

A data signal is inputted from the CPU 20 to the RAM-read/write circuit 40 through the data bus 22. A command for determining an operation of the RAM-read/write circuit 40 is set as a bit signal in a predetermined bit position in the data signal. Various commands for the RAM-read/write circuit 40 will be described in detail later on.

The write signal is inputted from the CPU 20 to the RAM-read/write circuit 40 through the control bus. The system resetting signal SR which is generated within the router 10a, for example, is inputted to the RAM-read/write circuit 40 through the control bus. The system clock signal SC is inputted to the RAM-read/write circuit 40 through a clock line.

The RAM-read/write circuit 40 is decoded by the address signal from the CPU 20 at this time. The RAM-read/write circuit 40 is then supplied with the data signal from the CPU 20. When the RAM-read/write circuit 40 receives the write signal from the CPU 20, the RAM-read/write circuit 40 holds the supplied data signal and outputs a select signal, a clear signal, a read signal, and a write signal according to the command in the data signal.

Figure 7:
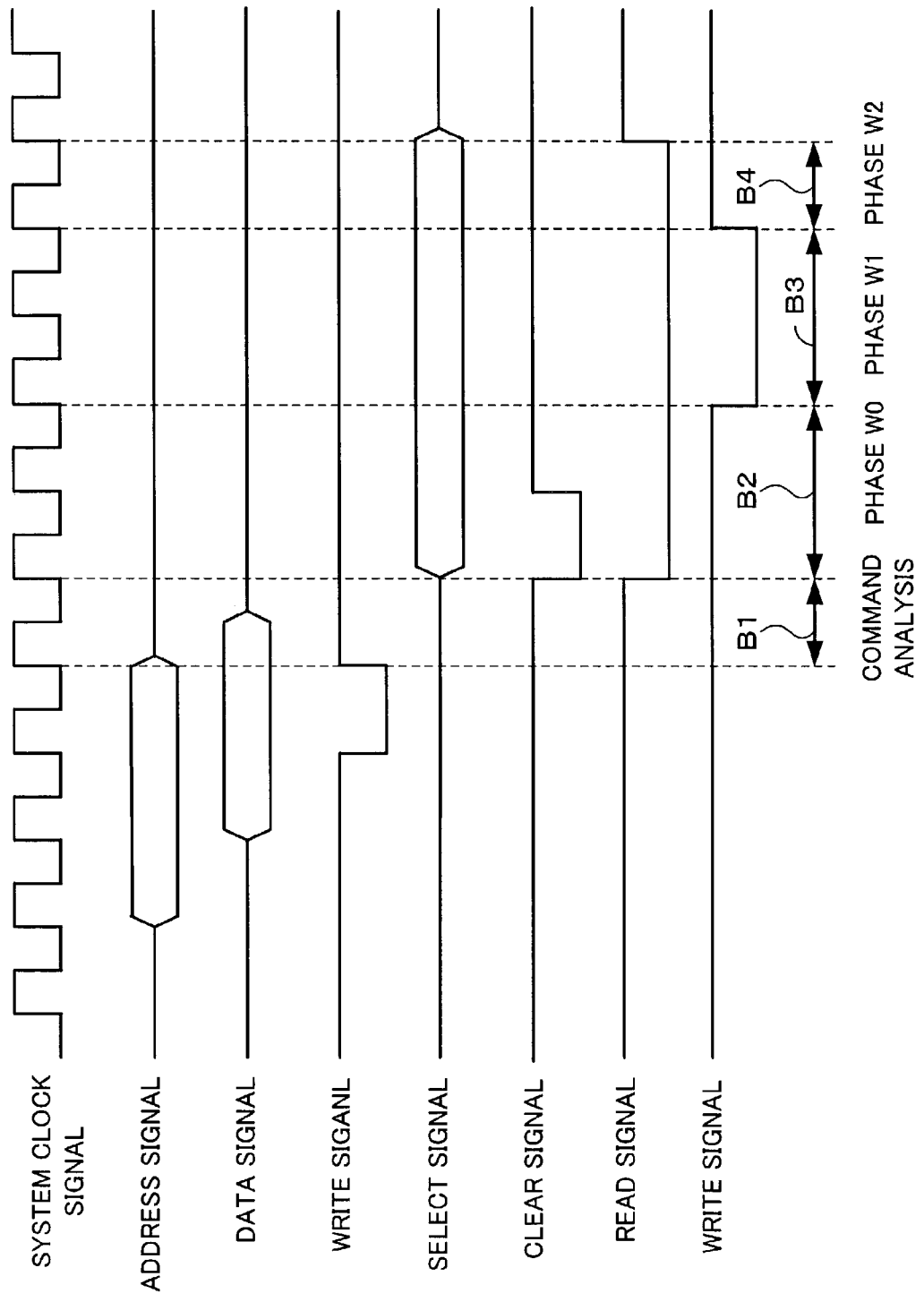
FIG. 7 is a timing chart of operation of the RAM-read/write circuit.

FIG. 7 is a timing chart of operation of the RAM-read/write circuit 40. The RAM-read/write circuit 40 operates in synchronism with a system clock signal SC shown in FIG. 7. The RAM-read/write circuit 40 is supplied with an address signal and a data signal which is inputted later than the address signal, from the CPU 20. In the example shown in FIG. 7, the data signal is outputted from the CPU 20 later than the address signal by one clock period of the system clock signal SC.

The RAM-read/write circuit 40 is also supplied with a write signal later than the data signal, from the CPU 20. In the example shown in FIG. 7, the write signal is outputted from the CPU 20 later than the data signal by one clock period of the system clock signal SC. The RAM-read/write circuit 40 is supplied with the data signal inputted thereto in synchronism with a positive-going edge of the write signal.

The RAM-read/write circuit 40 analyzes a command in the inputted data signal during a command analysis period indicated by the arrow B1 from the positive-going edge of the write signal. The RAM-read/write circuit 40 outputs a select signal, a clear signal, a read signal, and a write signal according to the command in the data signal.

FIG. 8 shows a list 90 of commands for the RAM-read/write circuit 40. As indicated by the list 90 shown in FIG. 8, 0th to 4th bits of the 32-bit data signal sets the effective address length of a network address in the RAM-read/write circuit 40. A 5th bit of the data signal determines whether the RAM-read/write circuit 40 is to select all the RAMs 60-0 through 60-31 or not. A 6th bit of the data signal determines whether the RAM-read/write circuit 40 is to output a read signal to the signal line R or a write signal to the signal line W. 7th through 9th bits of the data signal set the number of cycles of the read signal to be outputted to the signal line R. 10th and 11th bits of the data signal set the number of cycles, in a phase W0 indicated by the arrow B2 in FIG. 7, of the write signal to be outputted to the signal line R, in the RAM-read/write circuit 40. 12th and 13th bits of the data signal set the number of cycles, in a phase W1 indicated by the arrow B3 in FIG. 7, of the write signal to be outputted to the signal line W, in the RAM-read/write circuit 40. 14th and 15th bits of the data signal set the number of cycles, in a phase W2 indicated by the arrow B4 in FIG. 7, of the write signal to be outputted to the signal line W, in the RAM-read/write circuit 40.

The RAM-read/write circuit 40 outputs a select signal to the signal lines Sel of the select bus 41 according to the effective address length set in the 0th to 4th bits of the data signal. For example, if the effective address length (0, 0, 0, 0, 0) (binary notation) is set in the 0th to 4th bits of the data signal, then the RAM-read/write circuit 40 outputs a select signal to the select line Sel<0> of the select bus 41. If the effective address length (0, 0, 0, 0, 1) is set in the 0th to 4th bits of the data signal, then the RAM-read/write circuit 40 outputs a select signal to the select line Sel<1> of the select bus 41. If the effective address length (1, 1, 1, 1, 1) is set in the 0th to 4th bits of the data signal, then the RAM-read/write circuit 40 outputs a select signal to the select line Sel<31> of the select bus 41.

The RAM-read/write circuit 40 selects all the RAMs 60-0 through 60-31 according to a bit signal set in the 5th bit of the data signal. For example, if "1" is set in the 5th bit of the data signal, then the RAM-read/write circuit 40 outputs a select signal to the signal lines S<31:0> of the select bus 41.

The RAM-read/write circuit 40 outputs a read signal to the signal line R or a write signal to the signal line W according to the bit signal set in the 6th bit of the data signal. For example, if "1" is set in the 6th bit of the data signal, then the RAM-read/write circuit 40 outputs a write signal to the signal line W.

The RAM-read/write circuit 40 sets the number of cycles, in the phase W0 indicated by the arrow B2 in FIG. 7, of the write signal according to the number of cycles set in the 10th and 11th bits of the data signal. The number of cycles thus set establishes a period after the command analysis until the write signal falls.

The RAM-read/write circuit 40 sets the number of cycles, in the phase W1 indicated by the arrow B3 in FIG. 7, of the write signal according to the number of cycles set in the 12th and 13th bits of the data signal. The number of cycles thus set establishes a period in which the write signal has a low level.

The RAM-read/write circuit 40 sets the number of cycles, in the phase W2 indicated by the arrow B4 in FIG. 7, of the write signal according to the number of cycles set in the 14th and 15th bits of the data signal. Having waited for the number of cycles set in the phase W2, the RAM-read/write circuit 40 can be supplied with a new data signal inputted from the CPU 20. In order to clear the data held in the selector circuit 70, the RAM-read/write circuit 40 outputs a clear signal which is inserted in one cycle prior to its read/write operation.

Figure 9:
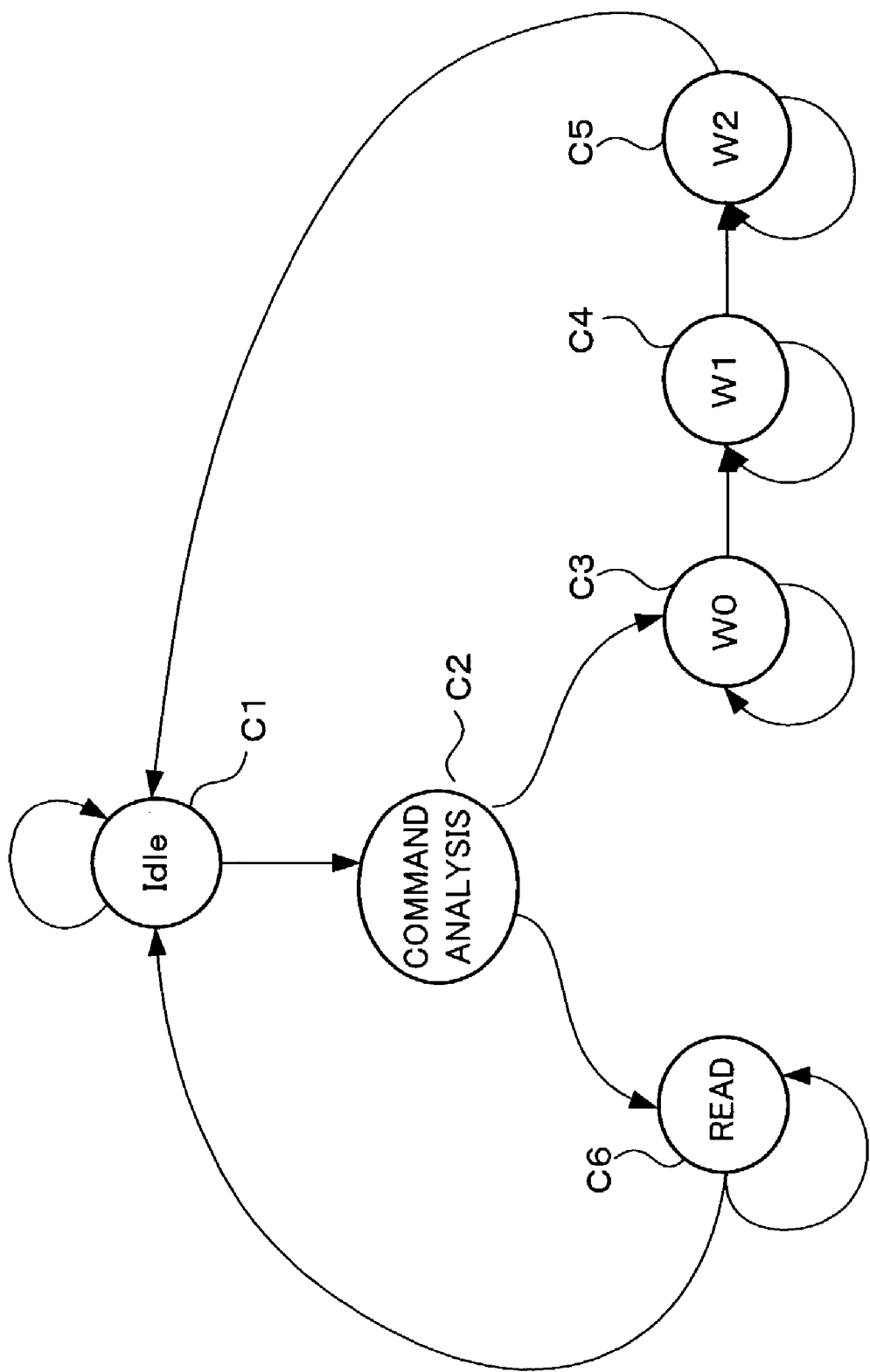
FIG. 9 is a diagram showing a state machine of the RAM-read/write circuit.

FIG. 9 shows a state machine of the RAM-read/write circuit 40. As shown in FIG. 9, in a state C1, the RAM-read/write circuit 40 waits for the inputting of a data signal from the CPU 20 (Idle state). When a data signal is inputted from the CPU 20 to the RAM-read/write circuit 40, the RAM-read/write circuit 40 goes to a state C2 and analyzes a command contained in the data signal.

If the command represents the writing of a select signal, then the RAM-read/write circuit 40 goes to a state C3 in which it waits for the outputting of a write signal during the period of the phase W0. When the period of the phase W0 elapses, the RAM-read/write circuit 40 goes to a state C4 in which it outputs a write signal during the period of the phase W1. When the period of the phase W1 elapses, the RAM-read/write circuit 40 goes to a state C5 in which it does not accept a data signal during the period of the phase W2. When the period of the phase W2 elapses, the RAM-read/write circuit 40 goes to the state C1 in which it waits for the inputting of a data signal from the CPU 20 (Idle state).

If the command represents the reading of port information, then the RAM-read/write circuit 40 goes to a state C6 in which it continuously outputs a read signal according to the command in the data signal. Thereafter, the RAM-read/write circuit 40 goes to the state C1 in which it waits for the inputting of a data signal from the CPU 20 (Idle state).

As described above, the RAM-read/write circuit 40 is selected by the address signal from the CPU 20 and is supplied with a data signal, i.e., an IP address. Then, the RAM-read/write circuit 40 analyzes a command contained in the data signal, and outputs a select signal, a read signal, a write signal, and a clear signal.

Figure 10:
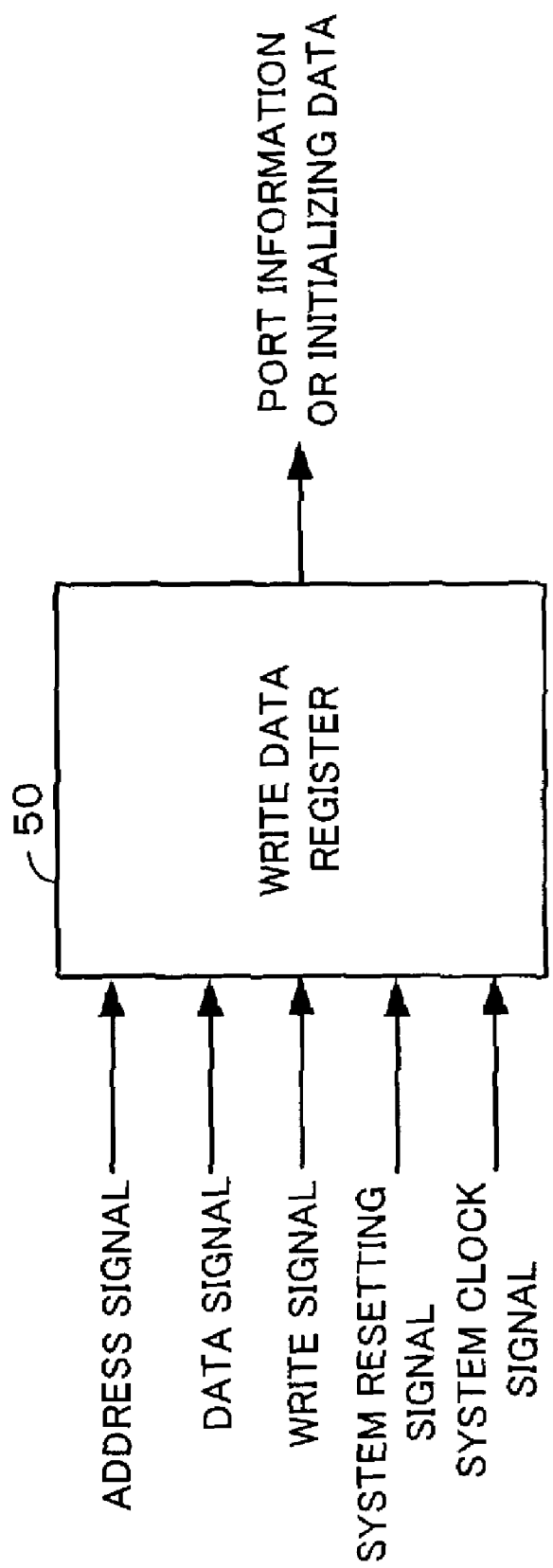
FIG. 10 is a diagram showing a write data register shown in FIG. 3 and signals that are inputted and outputted to and from the write data register.

FIG. 10 shows the write data register 50 shown in FIG. 3 and signals that are inputted to and outputted from the write data register 50. An address signal from the CPU 20 is inputted to the write data register 50 through the address bus 21. The write data register 50 is assigned to a memory space in the CPU 20, and selected by the address signal from the CPU 20.

A data signal is inputted from the CPU 20 to the write data register 50 through the data bus 22. The data signal sent to the write data register 50 represents 8-bit port information or initializing data for initializing the RAMs 60-0 through 60-31.

A write signal is inputted from the CPU 20 to the write data register 50 through a control bus, not shown in FIG. 3. A system resetting signal SR which is generated within the router 10a, for example, is inputted to the write data register 50 through the control bus. A system clock signal SC is inputted to the address register 30 through a clock line, not shown in FIG. 3.

The write data register 50 is selected by an address signal from the CPU 20. A data signal, i.e., port information or initializing data, is inputted from the CPU 20 to the write data register 50. When the write data register 50 then receives a write signal from the CPU 20 at this time, the write data register 50 holds the value of the inputted port information or initializing data, and outputs the value of the inputted port information or initializing data to the selector circuit 70.

Figure 11:
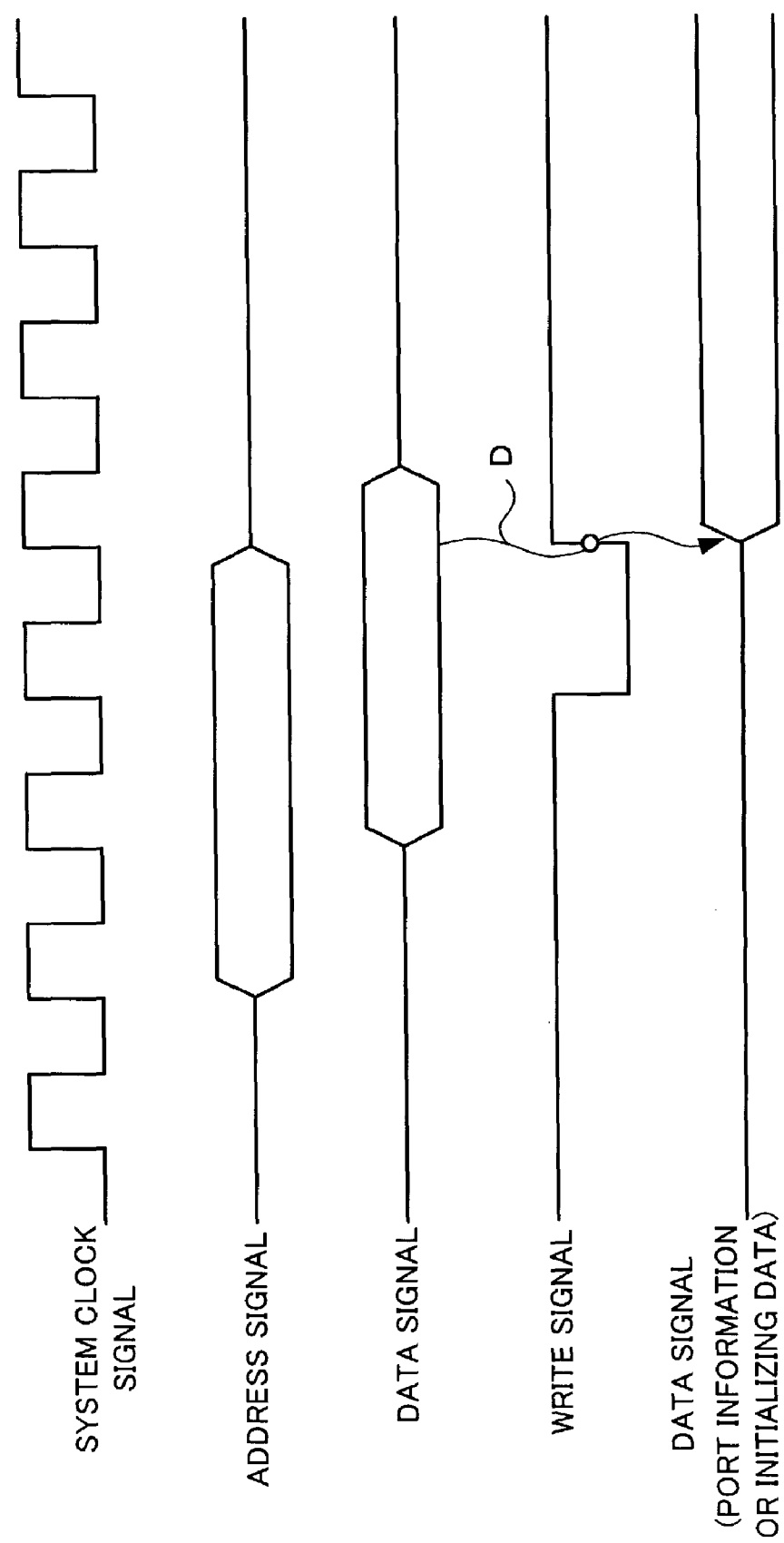
FIG. 11 is a timing chart of operation of the write data register.

FIG. 11 is a timing chart of operation of the write data register 50. The write data register 50 operates in synchronism with a system clock signal SC shown in FIG. 11. The write data register 50 is supplied with an address signal and a data signal which is inputted later than the address signal, from the CPU 20. In the example shown in FIG. 11, the data signal is outputted from the CPU 20 later than the address signal by one clock period of the system clock signal SC.

The write data register 50 is also supplied with a write signal later than the data signal, from the CPU 20. In the example shown in FIG. 11, the write signal is outputted from the CPU 20 later than the data signal by one clock period of the system clock signal SC. The write data register 50 holds the inputted data signal and outputs the data signal to the selector circuit 70 in synchronism with a positive-going edge of the write signal indicated by the arrow D.

When a system resetting signal SR is inputted to the write data register 50, the write data register 50 resets the data signal held therein, e.g., to "0".

As described above, the write data register 50 is decoded by the address signal from the CPU 20. The write data register 50 is thus supplied with the data signal, i.e., port information or initializing data, from the CPU 20. When the write data register 50 receives the write signal from the CPU 20, the write data register 50 holds the value of the supplied port information or initializing data and outputs the value of the port information or initializing data to the selector circuit 70.

Figure 12:
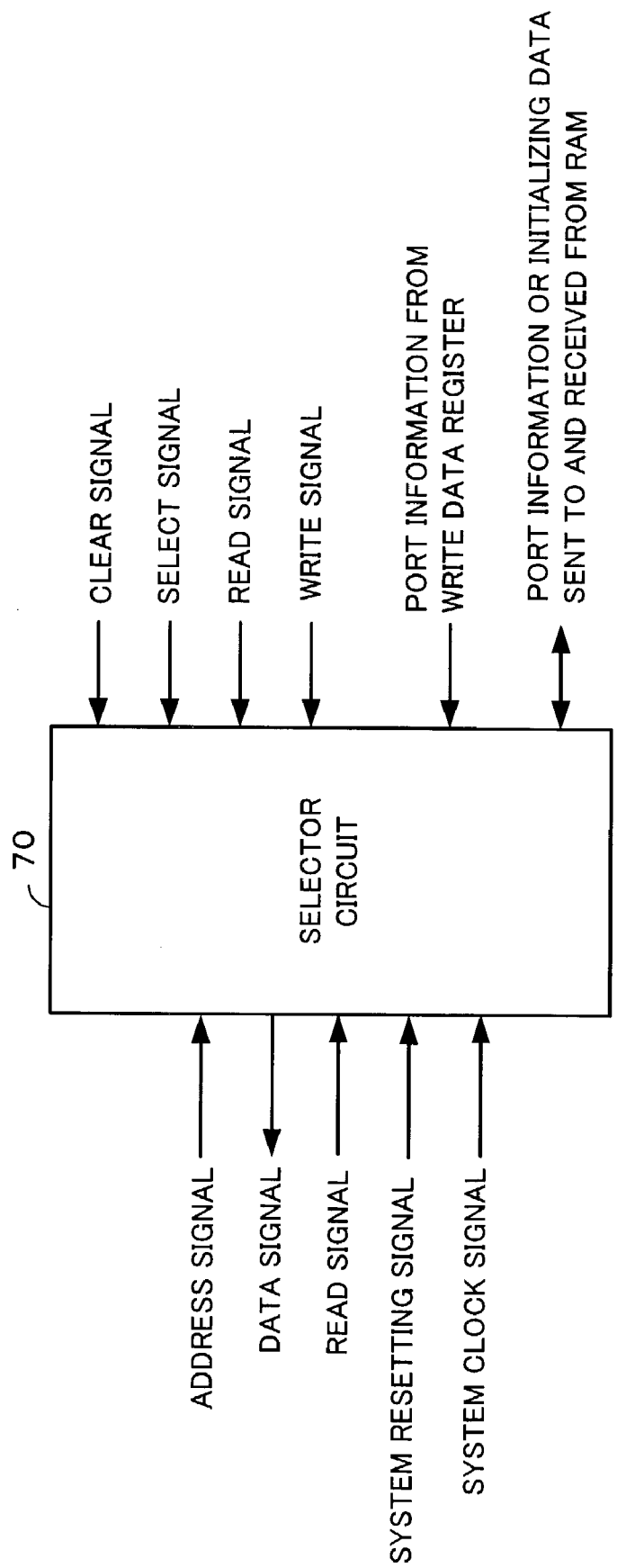
FIG. 12 is a diagram showing a selector circuit shown in FIG. 3 and signals that are inputted to and outputted from the selector circuit.

FIG. 12 shows the selector circuit 70 shown in FIG. 3 and signals that are inputted to and outputted from the selector circuit 70. An address signal is inputted from the CPU 20 to the selector circuit 70 through the address bus 21. The selector circuit 70 is assigned to a memory space in the CPU 20, and selected by the address signal from the CPU 20.

The selector circuit 70 outputs a data signal to the CPU 20 through the data bus 22. The data signal represents 8-bit port information outputted from the RAMs 60-0 through 60-31.

A read signal from the CPU 20 is inputted to the selector circuit 70 through a control bus, not shown in FIG. 3. A system resetting signal SR of the CPU 20 is inputted to the selector circuit 70 through the control bus. A system clock signal SC is inputted to the selector circuit 70 through a clock line, not shown in FIG. 3.

A clear signal is inputted from the RAM-read/write circuit 40 to the selector circuit 70. A select signal is also inputted from the RAM-read/write circuit 40 to the selector circuit 70. A read signal and a write signal are also inputted from the RAM-read/write circuit 40 to the selector circuit 70. The selector circuit 70 outputs the port information or initializing data to the RAMs 60-0 through 60-31, or the port information to be stored in the RAMs 60-0 through 60-31 is inputted to the selector circuit 70. The port information or initializing data outputted from the write data register 50 is inputted to the selector circuit 70.

Figure 13:
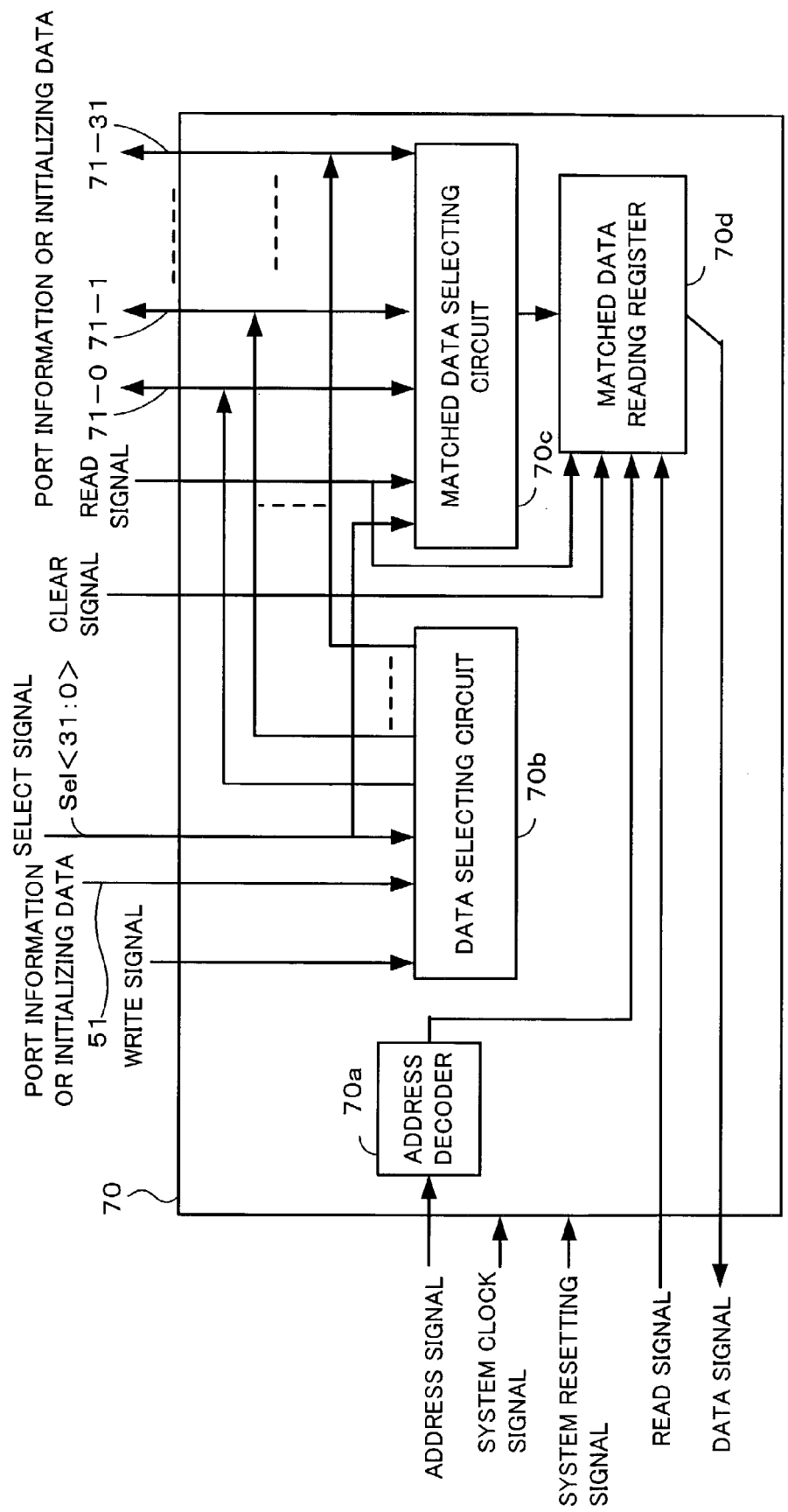
FIG. 13 is a block circuit diagram of the selector circuit.

FIG. 13 shows the selector circuit 70 in block form. As shown in FIG. 13, the selector circuit 70 comprises an address decoder 70a, a data selecting circuit 70b, a matched data selecting circuit 70c, and a matched data reading register 70d. The selector circuit 70 operates in synchronism with a system clock signal SC.

A decoded address signal is inputted from the CPU 20 to the address decoder 70a. When the address signal is inputted to the address decoder 70a, the address decoder 70a selects the matched data reading register 70d.

The data selecting circuit 70b is connected to the signal line W, the data bus 51, and the signal lines Sel<31:0>. When a write signal is inputted from the signal line W to the data selecting circuit 70b, the data selecting circuit 70b outputs port information or initializing data inputted thereto through the data bus 51 to one of the data buses 71-0 through 71-31 which is connected to the RAM that is selected by the select signal.

The matched data selecting circuit 70c is connected to the data buses 71-0 through 71-31, the signal line R, and the signal lines Sel<31:0>. When a read signal is inputted from the signal line R to the matched data selecting circuit 70c, the matched data selecting circuit 70c receives port information which is outputted from the RAMs 60-0 through 60-31 to the data buses 71-0 through 71-31. The matched data selecting circuit 70c refers to the 7th bits of the inputted port information, and selects the port information whose 7th bit is "1". The matched data selecting circuit 70c further selects, from the selected port information, the port information outputted from the RAM which is connected to the most signal lines A, and outputs the selected port information to the matched data reading register 70d.

The matched data reading register 70d holds the port information outputted from the matched data selecting circuit 70c. When the matched data reading register 70d is selected by the address decoder 70a and receives a read signal from the CPU 20, the matched data reading register 70d outputs the port information (data signal) held therein to the data bus 22. The matched data reading register 70d is connected to the signal line Clr. When the matched data reading register 70d receives a clear signal through the signal line Clr, the matched data reading register 70d clears the port information held therein, e.g., sets it to "0".

Operation of the selector circuit 70 will be described below.

First, a process of initializing the RAMs 60-0 through 60-31 will be described below. Initializing data is inputted from the data bus 51 to the data selecting circuit 70b. A select signal for selecting one of the RAMs 60-0 through 60-31 which is to be initialized is inputted to the data selecting circuit 70b through the signal line Sel<31:0>. When the data selecting circuit 70b receives a write signal from the signal line W, the data selecting circuit 70b outputs the initializing data to one of the data buses 71-0 through 71-31 which is connected to the RAM selected by the select signal.

In this manner, the initializing data and the select signal are inputted to the selector circuit 70. When the write signal is inputted to the selector circuit 70, the selector circuit 70 outputs the initializing data to one of the data buses 71-0 through 71-31 which is connected to the RAM selected by the select signal. The RAMs 60-0 through 60-31 are thus initialized.

Then, a process of setting port information in the RAMs 60-0 through 60-31 will be described below. Port information to be set in a RAM is inputted to the data selecting circuit 70b through the data bus 51. A select signal for selecting one of the RAMs 60-0 through 60-31 in which port information is to be set is inputted to the data selecting circuit 70b through the signal lines Sel<31:0>. When the data selecting circuit 70b receives a write signal from the signal line W, the data selecting circuit 70b outputs the port information to one of the data buses 71-0 through 71-31 which is connected to the RAM selected by the select signal.

In this manner, the port information to be stored in a RAM is inputted to the selector circuit 70. When a write signal is inputted to the selector circuit 70, the selector circuit 70 outputs the port information to one of the data buses 71-0 through 71-31 which is connected to the RAM selected by the select signal. The port information is thus written in the RAMs 60-0 through 60-31.

A process of outputting port information from the RAMs 60-0 through 60-31 will be described below. When a read signal is inputted to the matched data selecting circuit 70c, the matched data selecting circuit 70c receives port information outputted from the RAMs 60-0 through 60-31. The matched data selecting circuit 70c refers to the 7th bits of the port information outputted from the RAMs 60-0 through 60-31, and selects the port information whose 7th bit is "1". The matched data selecting circuit 70c further selects, from the selected port information, the port information outputted from the RAM which is connected to the most signal lines A. The matched data selecting circuit 70c outputs the selected port information to the matched data reading register 70d.

The matched data reading register 70d holds the port information outputted from the matched data selecting circuit 70c. The matched data reading register 70d is decoded by the address decoder 70a. When the matched data reading register 70d receives a read signal from the CPU 20, the matched data reading register 70d outputs the port information held therein to the data bus 22.

In this manner, the port information outputted from the RAMs 60-0 through 60-31 is inputted to the selector circuit 70. The selector circuit 70 selects the port information outputted from one of the RAMs 60-0 through 60-31 which is connected to the most signal lines A<31:0>, from the inputted port information, and outputs the selected port information to the data bus 22.

A second embodiment of the present invention will be described below.

Figure 14:
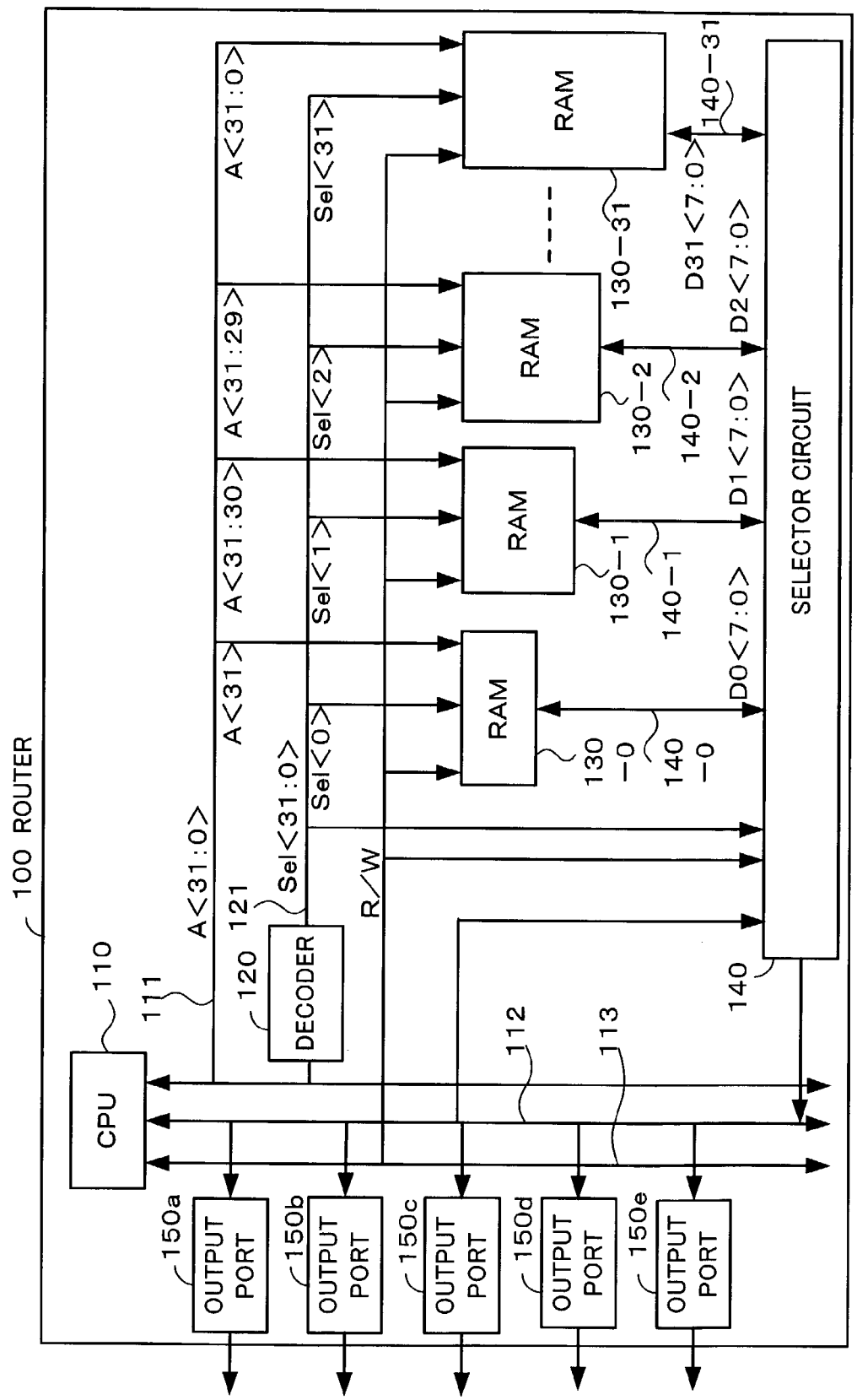
FIG. 14 is a block circuit diagram of a router according to a second embodiment of the present invention.

FIG. 14 shows in block form a router 100 according to a second embodiment of the present invention. As shown in FIG. 14, the router 100 comprises a CPU 110, a decoder 120, RAMs 130-0 through 130-31, a selector circuit 140, and output ports 150a through 150e.

The CPU 110 is connected to a 64-bit address bus 111, a 32-bit data bus 112, and a control bus 113. The CPU 110 outputs an IP address of a packet sent from the networks 11a through 11f shown in FIG. 2 or other networks to low-order 32 bits of an address bus 111. The CPU 110 outputs a select signal for selecting the RAMs 130-0 through 130-31 to high-order 32 bits of the address bus 111. The CPU 110 outputs a write signal and a read signal to the control bus 113. The CPU 110 writes the port information of an output port into the address of the RAMs 130-0 through 130-31 which corresponds to the network address of a network as a connection destination. The CPU 111 writes initializing data, e.g., "0", into the RAMs 130-0 through 130-31 to be initialized.

The decoder 120 is connected to the high-order 32 bits of the address bus 111. The decoder 120 holds a select signal outputted from the CPU 110, and outputs the select signal to a 32-bit select bus 121. As with the first embodiment, the 32-bit select bus 121 has signal lines represented by Sel<31:0>.

The RAMs 130-0 through 130-31 are connected to progressively larger numbers of signal lines A of the address bus 111 which increase, successively one by one, from the high-order bit toward the low-order bit, in the low-order 32 bits, of the address bus 111. Specifically, as with the first embodiment, the 32-bit address bus 111 has signal lines represented by A<31:0>. The RAM 130-0 is connected to the signal line A<31> of the address bus 111, the RAM 130-1 to the signal lines A<31:30> of the address bus 111, and the RAM 130-2 to the signal lines A<31:29> of the address bus 111. Similarly, the other RAMs are connected to successively incremental numbers of signal lines of the address bus 111 which increase, successively one by one, toward the low-order bit of the address bus 111, and the RAM 130-31 is connected to the signal lines A<31:0> of the address bus 111. The signal lines A<31:0> correspond to the bits that represent an IP address.

The RAMs 130-0 through 130-31 are also connected to the respective signal lines Sel of the select bus 121 which range successively from the low-order bit to the high-order bit of the select bus 121. Specifically, the RAM 130-0 is connected to the signal line Sel<0> of the select bus 121, the RAM 130-1 to the signal line Sel<1> of the select bus 121, and the RAM 130-2 to the signal line Sel<2> of the select bus 121. Similarly, the other RAMs are connected to the respective signal lines of the select bus 121 which range successively to the high-order bit of the select bus 121, and the RAM 130-31 is connected to the signal line Sel<31> of the select bus 121. The RAMs 130-0 through 130-31 are also connected to signal lines R, W of the control bus 113.

The selector circuit 140 is connected to the RAMs 130-0 through 130-31 via respective 8-bit data buses 140-0 through 140-31. As with the first embodiment, signal lines of the data buses 140-0 through 140-31 are represented by DO<7:0> through D31<7:0>. The selector circuit 140 is also connected to the signal lines R, W of the control bus 113 and to the data bus 112.

The selector circuit 140 selects the port information of a RAM which is connected to the most signal lines, from the port information outputted from the RAMs 130-0 through 130-31, and outputs the selected port information to the data bus 112. The selector circuit 140 is supplied with port information or initializing data to be set in the RAMs 130-0 through 130-31, and outputs the supplied port information or initializing data to the data buses 140-0 through 140-31.

The output port 150a is connected to the network 11b shown in FIG. 2. The output port 150b is connected to the network 11c. The output port 150c is connected to the network 11d. The output port 150d is connected to the network 11e. The output port 150e is connected to the network 11f. The output ports 150a through 150e output a packet sent from the CPU 110 to the network 11b through 11f as connection destinations.

Operation of the router 100 shown in FIG. 14 will be described below.

First, a process of initializing the RAMs 130-0 through 130-31 will be described below. The CPU 110 outputs a network address to be initialized into the low-order 32 bits of the address bus 111. The CPU 110 outputs a select signal for selecting one of the RAMs 130-0 through 130-31 which is connected as many signal lines as the number of bits of the network address to be initialized, to the high-order 32 bits of the address bus 111. The select signal outputted to the high-order 32 bits of the address bus 111 is supplied to the decoder 120, which holds and outputs the select signal to the signal lines Sel<31:0>.

The CPU 110 outputs initializing data, e.g., binary 8-bit "0", to the data bus 112. The CPU 110 outputs a write signal to the control bus 113.

When the write signal is inputted to the selector circuit 140 through the signal line W of the control bus 113, the selector circuit 140 outputs the initializing data outputted to the data bus 112 to the data buses 140-0 through 140-31.

When the write signal is inputted to through the signal line W of the control bus 113 to the RAMs 130-0 through 130-31 selected by the select signal, the RAMs 130-0 through 130-31 store the initializing data outputted to the data buses 140-0 through 140-31.

In this manner, the RAMs 130-0 through 130-31 are initialized by the initializing data.

The addresses other than the memory addresses corresponding to the network addresses of the networks that are connected to the output ports 150a through 150e are adapted to store the initializing data in order to distinguish themselves from port information.

Next, a process of setting port information in the memory addresses of the RAMs 130-0 through 130-31 which correspond to the network addresses will be described below. The CPU 110 outputs one of the network addresses of the networks 11b through 11f connected to the output ports 150a through 150e to the low-order 32 bits of the address bus 111. The CPU 110 outputs a select signal for selecting one of the RAMs 130-0 through 130-31 which is connected to as many signal lines as the number of bits of the network address outputted to the low-order 32 bits of the address bus 111, to the high-order 32 bits of the address bus 111. The decoder 120 holds the select signal outputted from the CPU 110, and outputs the select signal to the select bus 121.

The CPU 110 writes port information in the data bus 112. To the data bus 112, there is outputted port information representing one of the output ports 150a through 150e which is connected to one of the networks 11b through 11f which has the network address outputted to the low-order 32 bits of the address bus 111. The 7th bit of the port information is set to "1" which indicates that the port information itself is effective. The 6th through 0th bits of the port information are set as the port information of an output port from which a packet is to be outputted.

The selector circuit 140 outputs the port information outputted from the CPU 110 to the data buses 140-1 through 140-31.

When the CPU 110 outputs a write signal to the signal line W, one of the RAMs 130-0 through 130-31 which is selected by the select signal stores therein the port information outputted to the data buses 140-0 through 140-31.

In this manner, the memory addresses corresponding to the network addresses of the networks that are connected to the output ports 150a through 150e store the port information indicative of the output ports 150a through 150e.

A process of searching for a network address having the longest match for an IP address and sending a packet to the network address will be described below. The CPU 110 receives a packet sent from a network. The CPU 110 then outputs the IP address contained in the packet to the low-order 32 bits of the address bus 111.

When a read signal is outputted to the signal line R, the RAMs 130-0 through 130-31 output the information stored in the memory address corresponding to the IP address outputted to the signal lines A to the data buses 140-0 through 140-31.

The selector circuit 140 refers to the 7th bits of the port information outputted from the RAMs 130-0 through 130-31 to the data buses 140-0 through 140-31, and selects the port information whose 7th bit is "1". The selector circuit 140 further selects, from the selected port information, the port information outputted from the RAM which is connected to the most signal lines A. The selected port information represents the output port connected to the network whose network address has the longest match for the IP address. The selector circuit 140 outputs the selected port information to the data bus 112.

The CPU 110 refers to the port information outputted from the selector circuit 140, and outputs the packet to one of the output ports 150a through 150e, which sends the packet to the network to be connected thereto.

Since an output port connected to a network address which has the longest match for the IP address is determined in the RAMs without the necessity of processing operations, as described above, a longest match determining process can be carried out using commercially available ordinary memories.

Furthermore, the cost of the output port determining apparatus can be reduced by using commercially available ordinary memories.

Of the 64-bit address space, the low-order 32-bit memory space is used to search for a network address which has the longest match for the IP address, and the high-order 32-bit memory space is used to select the RAMs 130-0 through 130-31. As a consequence, the number of parts used is reduced as an address register for holding addresses and a data register for holding data are not required.

The router 100 may be implemented by a one-chip semiconductor device.

The address space in the CPU 110 will be described below.

Figure 15:
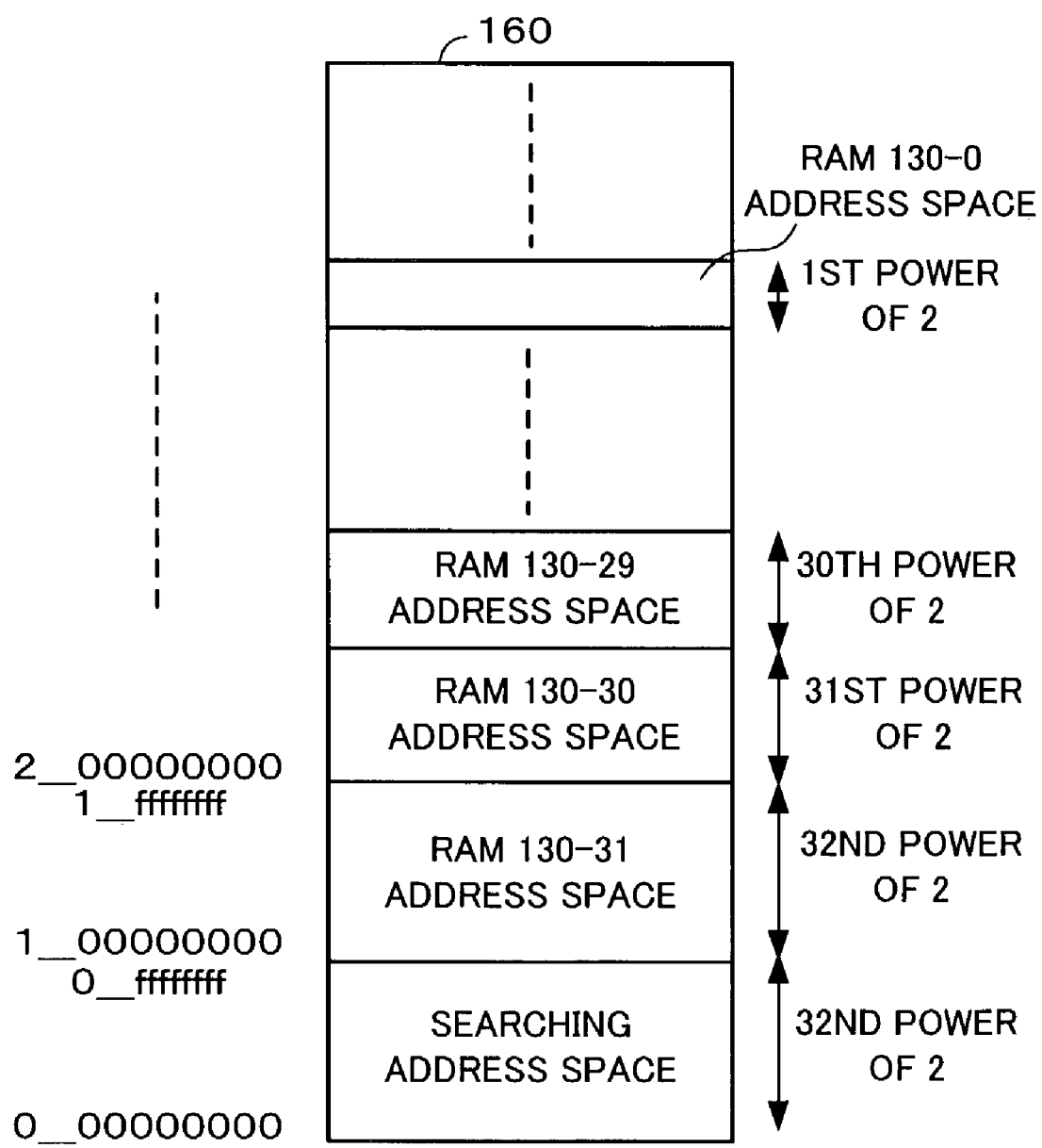
FIG. 15 is a diagram showing an address space of the CPU shown in FIG. 14.

FIG. 15 shows the address space in the CPU 110. In the following description, an address will be represented by a hexadecimal notation. The CPU 110 has a 64-bit address space. The CPU 110 is connected to the address bus 111, whose low-order 32 bits are connected to the RAMs 130-0 through 130-31. As shown by an address space 160 in FIG. 15, an address space ranging from 0__00000000 to 0_ffffffff of the CPU 110 serves as a memory space for searching a network address corresponding to the IP address.

The high-order 32 bits of the CPU 110 are connected to the decoder 120. The CPU 110 uses the high-order 32 bits to select the RAMs 130-0 through 130-31. As shown by the address space 160 in FIG. 15, an address space ranging from 1__00000000 to 1_ffffffff of the CPU 110 serves as a memory space for selecting the RAM 130-31. Similarly, the high-order 32 bits of the CPU 110 are used to select the RAMs 130-0 through 130-30.

The RAM 130-31 is connected to the signal lines A<31:0>, and has an address space width represented by the 32nd power of 2. The RAM 130-30 is connected to the signal lines A<31:1>, and has an address space width represented by the 31st power of 2. The number of signal lines A connected to the other RAMs is progressively reduced until the RAM 130-0 has an address space width represented by the 1st power of 2.

Since the CPU having a larger address space than IP addresses is used, as described above, RAMs can be selected with an address space greater than the address space of IP addresses. The number of parts that make up the router 100 can thus be reduced as an address register and a data register for holding data are not required.

Details of the selector circuit 140 will be described below.

Figure 16:
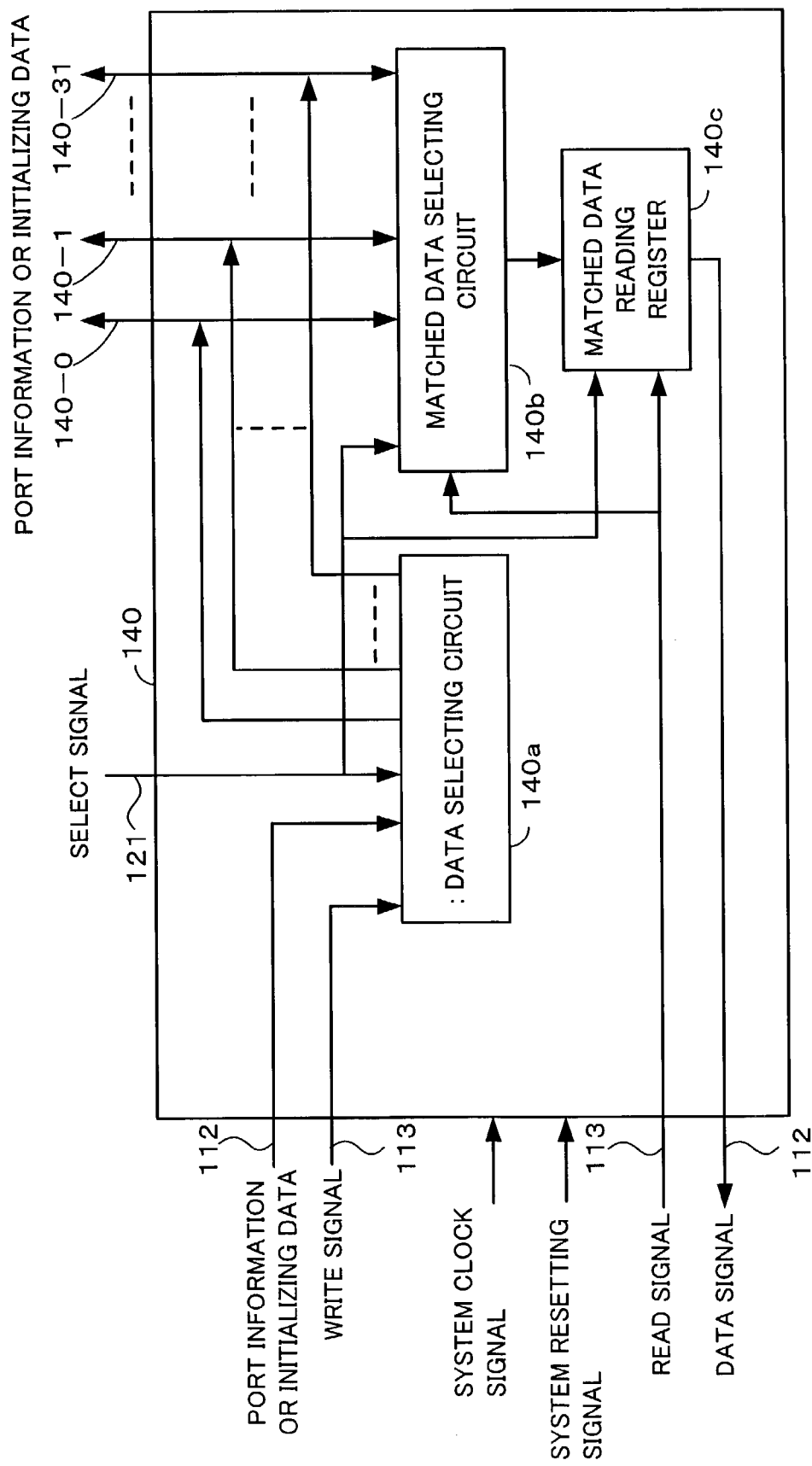
FIG. 16 is a block circuit diagram of the selector circuit shown in FIG. 14.

FIG. 16 shows the selector circuit 140 in block form. As shown in FIG. 16, the selector circuit 140 comprises a data selecting circuit 140a, a matched data selecting circuit 140b, and a matched data reading register 140c. The selector circuit 140 operates in synchronism with a system clock signal SC which is inputted to the selector circuit 140.

The data selecting circuit 140a is connected to the signal line W, the data bus 112, and the signal lines Sel<31:0>. When a write signal is inputted from the signal line W to the data selecting circuit 140a, the data selecting circuit 140a outputs port information or initializing data inputted thereto through the data bus 112 to one of the data buses 140-0 through 140-31 which is connected to the RAM that is selected by the select signal.

The matched data selecting circuit 140b is connected to the data buses 140-0 through 140-31, the signal line R, and the signal lines Sel<31:0>. When a read signal is inputted from the signal line R to the matched data selecting circuit 140b, the matched data selecting circuit 140b receives port information which is outputted from the RAMs 130-0 through 130-31 to the data buses 140-0 through 140-31. The matched data selecting circuit 140b refers to the 7th bits of the inputted port information, and selects the port information whose 7th bit is "1". The matched data selecting circuit 140b further selects, from the selected port information, the port information outputted from the RAM which is connected to the most signal lines A, and outputs the selected port information to the matched data reading register 140c.

The matched data reading register 140c holds the port information outputted from the matched data selecting circuit 140b. When the matched data reading register 140c receives a read signal from the CPU 110, the matched data reading register 140c outputs the port information (data signal) held therein to the data bus 112.

Operation of the selector circuit 140 will be described below.

First, a process of initializing the RAMs 130-0 through 130-31 will be described below. Initializing data is inputted from the data bus 112 to the data selecting circuit 140a. A select signal for selecting one of the RAMs 130-0 through 130-31 which is to be initialized is inputted to the data selecting circuit 140a through the signal line Sel<31:0>. When the data selecting circuit 140a receives a write signal from the signal line W, the data selecting circuit 140a outputs the initializing data to one of the data buses 140-0 through 140-31 which is connected to the RAM selected by the select signal.

In this manner, the initializing data and the select signal are inputted to the selector circuit 140. When the write signal is inputted to the selector circuit 140, the selector circuit 140 outputs the initializing data to one of the data buses 140-0 through 140-31 which is connected to the RAM selected by the select signal. The RAMs 130-0 through 130-31 are thus initialized.

Then, a process of setting port information in the RAMs 130-0 through 130-31 will be described below. Port information to be set in a RAM is inputted to the data selecting circuit 140a through the data bus 112. A select signal for selecting one of the RAMs 130-0 through 130-31 in which port information is to be set is inputted to the data selecting circuit 140a through the signal lines Sel<31:0>. When the data selecting circuit 140a receives a write signal from the signal line W, the data selecting circuit 140a outputs the port information to one of the data buses 140-0 through 140-31 which is connected to the RAM selected by the select signal.

In this manner, the port information to be stored in a RAM is inputted to the selector circuit 140. When a write signal is inputted to the selector circuit 140, the selector circuit 140 outputs the port information to one of the data buses 140-0 through 140-31 which is connected to the RAM selected by the select signal. The port information is thus written in the RAMs 130-0 through 130-31.

A process of outputting port information from the RAMs 130-0 through 130-31 will be described below. When a read signal is inputted to the matched data selecting circuit 140b, the matched data selecting circuit 140b receives port information outputted from the RAMs 130-0 through 130-31. The matched data selecting circuit 140b refers to the 7th bits of the port information outputted from the RAMs 130-0 through 130-31, and selects the port information whose 7th bit is "1". The matched data selecting circuit 140b further selects, from the selected port information, the port information outputted from the RAM which is connected to the most signal lines A. The matched data selecting circuit 140b outputs the selected port information to the matched data reading register 140c.

The matched data reading register 140c holds the port information outputted from the matched data selecting circuit 140b. When the matched data reading register 140c receives a read signal from the signal line R, the matched data reading register 140c outputs the port information held therein to the data bus 112.

In this manner, the port information outputted from the RAMs 130-0 through 130-31 is inputted to the selector circuit 140. The selector circuit 140 selects the port information outputted from one of the RAMs 130-0 through 130-31 which is connected to the most signal lines A<31:0>, from the inputted port information, and outputs the selected port information to the data bus 112.

According to the present invention, as described above, a plurality of memory devices store the port information of an output port at a memory address corresponding to the network address of a network connected to the output port. Each of the memory devices is connected to as many signal lines of an address bus as the number of bits of the network address which corresponds to the output port represented by the stored port information. When a node address is outputted to an address bus, the port information of the memory device which is connected to the most signal lines is selected from the port information outputted from the memory devices. Since the number of signal lines connected to the memory device coincides with the number of bits of the network address, the port information outputted from the memory device connected to the most signal lines, among all the outputted port information, represents the output port connected to the network having the longest network address. As a result, a longest match determining process can be carried out using a simple hardware arrangement without the necessity of processing operations within the memory devices.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An output port determining apparatus for determining an output port of data, comprising:

a plurality of output ports connected to networks identified by different network addresses, each network address having port information that corresponds thereto and an effective address length;

an address bus comprising a plurality of address signal lines for carrying node addresses which uniquely identify specific nodes of a network as connection destinations, the address signal lines respectively corresponding to the effective address lengths;

a plurality of memory devices corresponding to different effective address lengths and storing the port information that corresponds to the network addresses having the respective effective address lengths, wherein each memory device is connected to as many of the address signal lines as the effective address length corresponding thereto;

an address register placing a specified node address having a network address included therein on the address signal lines;

a selecting circuit selecting one of the memory devices that has a largest number of address signal lines connected thereto that correspond to the network address included in the node address, and outputting the port information stored in the selected memory device; and wherein the address signal lines connected to each successive different memory device carry a most significant bit and a successively increasing number of less significant bits of the node address.

2. The output port determining apparatus according to claim 1, further comprising:
a control circuit for outputting data to be outputted to one of said networks to one of said output ports based on said port information.

3. The output port determining apparatus according to claim 1, wherein said memory devices store, at addresses thereof other than the memory addresses corresponding to the network addresses, initializing information that is distinguished from said port information.

4. The output port determining apparatus according to claim 1, wherein said port information includes identifying information which differentiate said port information from other types of information.

5. The output port determining apparatus according to claim 4, wherein said selecting circuit identifies said port information based on said identifying information, and selects the port information stored in said selected memory device.

6. The output port determining apparatus according to claim 1, further comprising:
a specifying circuit for specifying one of said memory devices; and
a write circuit for writing said port information in the specified memory device at the memory address corresponding to the network address.

7. The output port determining apparatus according to claim 6, wherein said write circuit stores initializing information to distinguish from said port information at addresses of said memory devices other than the memory addresses corresponding to the network addresses.

8. The output port determining apparatus according to claim 1, further comprising:
a central processing unit having an address space equal to or greater than a node address space of said node address, for specifying one of said memory devices which is connected to as many signal lines as a number of bits of said network address, in said address space equal to or greater than the node address space, and specifying the memory address corresponding to the network address in said memory device within said node address space.

9. The output port determining apparatus according to claim 8, wherein said central processing unit writes said port information into said memory devices at the memory addresses thereof corresponding to the network addresses.

10. The output port determining apparatus according to claim 8, wherein said central processing unit writes initializing information to distinguish from said port information into said memory devices at addresses other than the memory addresses thereof corresponding to the network addresses.

11. A semiconductor device for determining an output port of data, comprising:
a plurality of output ports connected to networks identified by different network addresses, each network address having port information that corresponds thereto and an effective address length;
an address bus comprising a plurality of address signal lines for carrying node addresses which uniquely identify specific nodes of a network as connection destinations, the address signal lines respectively corresponding to the effective address lengths;
a plurality of memory devices corresponding to different effective address lengths and storing the port information that corresponds to the network addresses having the respective effective address lengths, wherein each memory device is connected to as many of the address signal lines as the effective address length corresponding thereto;
an address register placing a specified node address having a network address included therein on the address signal lines;
a selecting circuit selecting one of the memory devices that has a largest number of address signal lines connected thereto that correspond to the network address included in the node address, and outputting the port information stored in the selected memory device; and
wherein the address signal lines connected to each successive different memory device carry a most significant bit and a successively increasing number of less significant bits of the node address.

12. A method of determining an output port of data, comprising the steps of:
receiving a node address which contains a network address and uniquely identifies a node as a connection destination;
outputting said node address to an address bus comprising a plurality of signal lines for carrying said node address and corresponding to different effective address lengths of network addresses of networks;
selecting, from a plurality of memory devices that are connected to a number of said signal lines that correspond to different effective address lengths of the networks, a memory device connected to a greatest number of said signal lines that correspond to said node address;
outputting, from the selected memory device, port information representing an output port from which to output data, the port information being stored at a memory address corresponding to the network address having the effective address length; and
wherein the address signal lines connected to each successive different memory device carry a most significant bit and a successively increasing number of less significant bits of the node address.

* * * * *